United States Patent [19]

Mase et al.

[11] Patent Number: 5,337,171
[45] Date of Patent: Aug. 9, 1994

[54] ELECTRO-OPTICAL DEVICE

[75] Inventors: Akira Mase, Aichi; Shunpei Yamazaki, Tokyo, both of Japan

[73] Assignee: Semiconductor Energy Laboratory Co., Ltd., Atsugi, Japan

[21] Appl. No.: 821,573

[22] Filed: Jan. 16, 1992

[30] Foreign Application Priority Data

| Jan. 17, 1991 | [JP] | Japan | 3-018487 |
| Jan. 17, 1991 | [JP] | Japan | 3-018488 |
| Jan. 17, 1991 | [JP] | Japan | 3-018489 |
| Jan. 17, 1991 | [JP] | Japan | 3-024210 |
| Feb. 15, 1991 | [JP] | Japan | 3-044235 |

[51] Int. Cl.$^5$ .................. G02F 1/133; G02F 1/1335; G02F 1/137
[52] U.S. Cl. .................... 359/53; 359/41; 345/88; 345/89
[58] Field of Search .......... 359/56, 54, 53, 100, 359/87, 93, 84, 85, 41; 340/784, 793; 345/89, 93, 88, 97, 99, 102

[56] References Cited

U.S. PATENT DOCUMENTS

| 4,758,818 | 7/1988 | Vatne | 359/53 |
| 4,842,379 | 6/1989 | Oishi et al. | 359/53 |
| 4,843,381 | 6/1989 | Baron | 340/784 |
| 4,921,334 | 5/1990 | Akodes | 340/784 |
| 5,103,328 | 4/1992 | Numao | 359/53 |
| 5,121,235 | 6/1992 | Matino et al. | 359/54 |
| 5,122,791 | 6/1992 | Gibbons et al. | |
| 5,124,695 | 6/1992 | Green | 359/87 |
| 5,126,865 | 6/1992 | Sarma | 359/59 |
| 5,128,782 | 7/1992 | Wood . | |
| 5,132,826 | 7/1992 | Johnson et al. | 359/93 |
| 5,157,524 | 10/1992 | Dijon et al. | 359/54 |
| 5,264,952 | 11/1993 | Fukutani et al. | 359/53 |

FOREIGN PATENT DOCUMENTS 0096636 4/1988 Japan .

OTHER PUBLICATIONS

Ross, 1988 International Display Research Conference, "720×400 Matrix Ferroelectric Display Operating at Video Frame Rate".

Primary Examiner—William L. Sikes
Assistant Examiner—Kenneth Parker
Attorney, Agent, or Firm—Sixbey, Friedman, Leedom & Ferguson

[57] ABSTRACT

An electro-optical apparatus comprising a pair of first and second devices, which are provided in an optical path extending from a light source and a screen for outputting a picture image thereon, the first and second devices each including a pair of first and second substrates each having electrodes and leads formed thereon, which sandwich therebetween an electro-optical modulating layer (comprising for example a liquid crystal composition) and a means for orienting the liquid crystal composition at least in an initial stage. The light transmission factor of the second device changes with time rotationally in the ratios of approximately $2^0$ to $2^1$ to $2^2$ to ... to $2^n$ (n is an arbitrary natural number). Thus, it is possible to realize tonal display, reduce the overall weight of the apparatus and improve the yield.

22 Claims, 35 Drawing Sheets

FIRST DEVICE

PIXEL A1

PIXEL A2

PIXEL B1

PIXEL B2

SECOND DEVICES
TRANSMISSION FACTOR FOR R

TRANSMISSION FACTOR FOR G

TRANSMISSION FACTOR FOR B

F I G. 5(B)
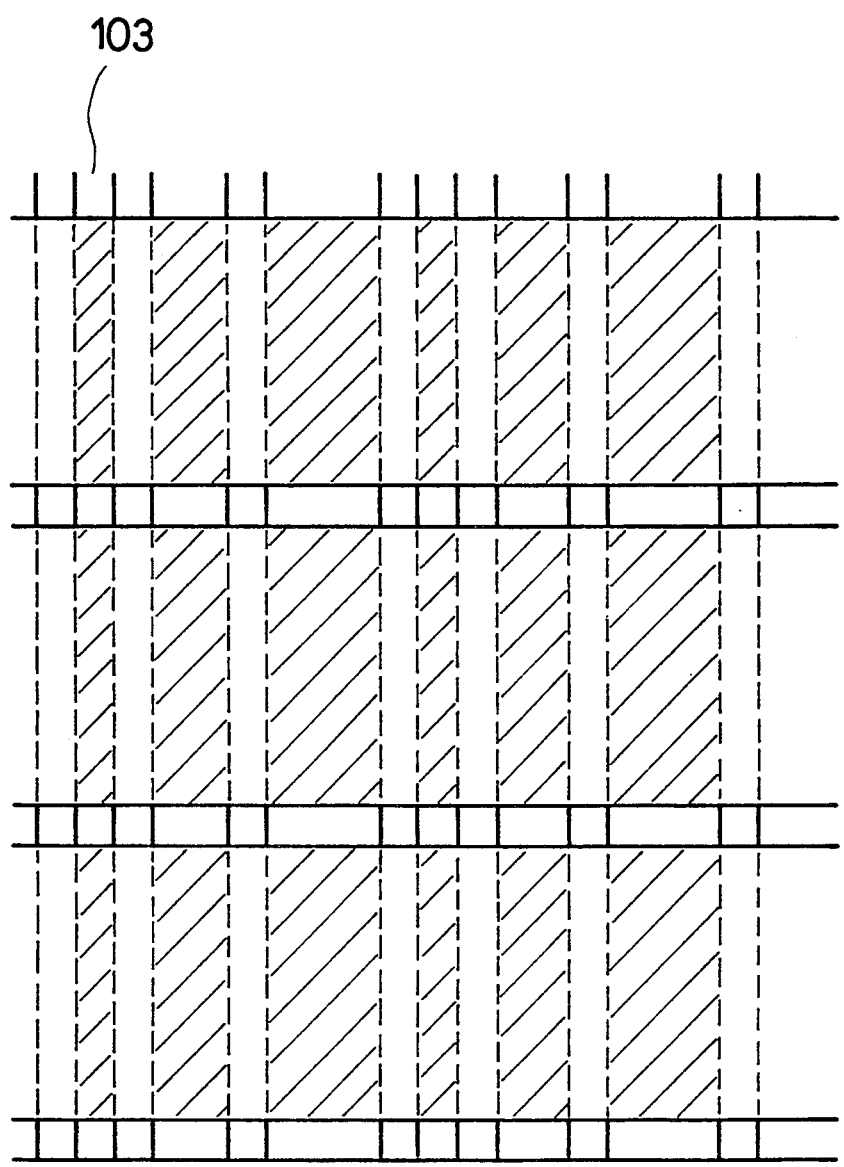

FIRST DEVICE

PIXEL A1

PIXEL A2

PIXEL B1

PIXEL B2

SECOND DEVICES

TRANSMISSION FACTOR FOR R

TRANSMISSION FACTOR FOR G

TRANSMISSION FACTOR FOR B

F I G. 20
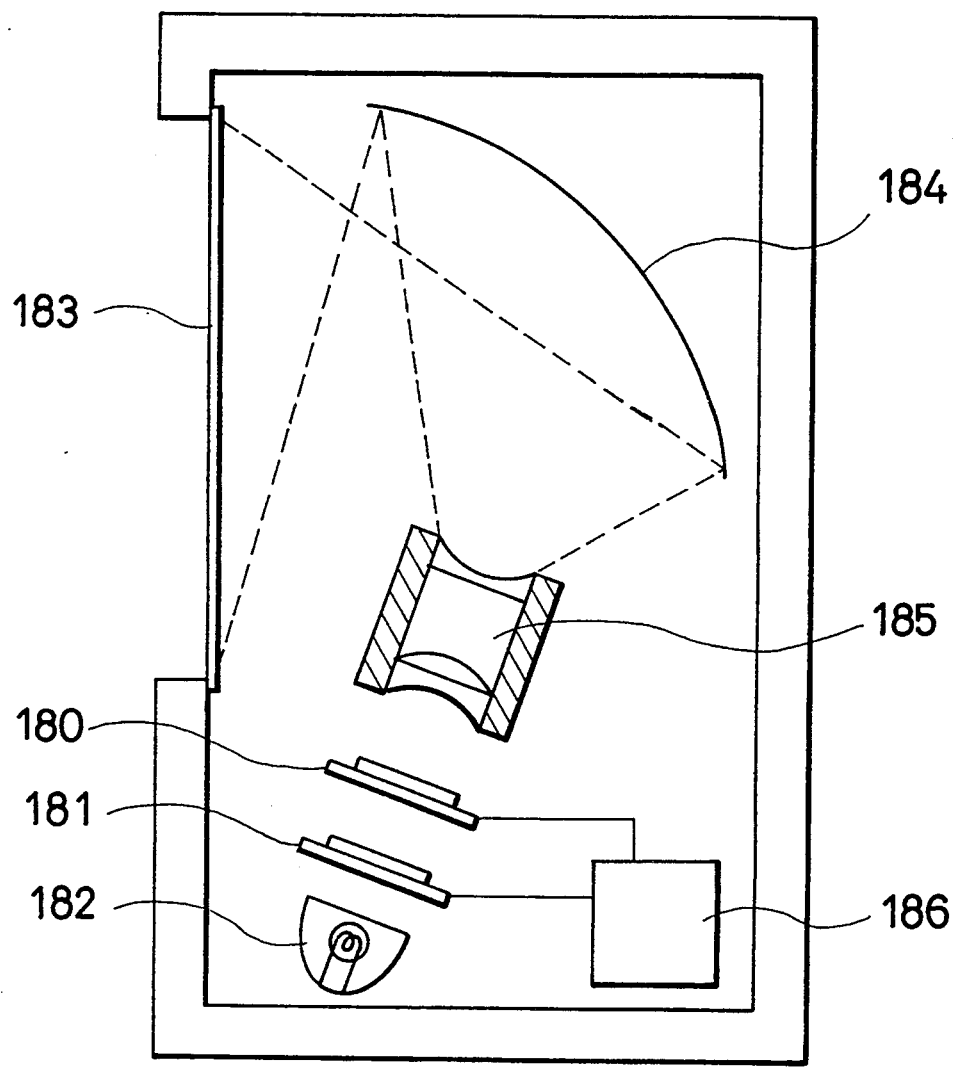

F I G. 22
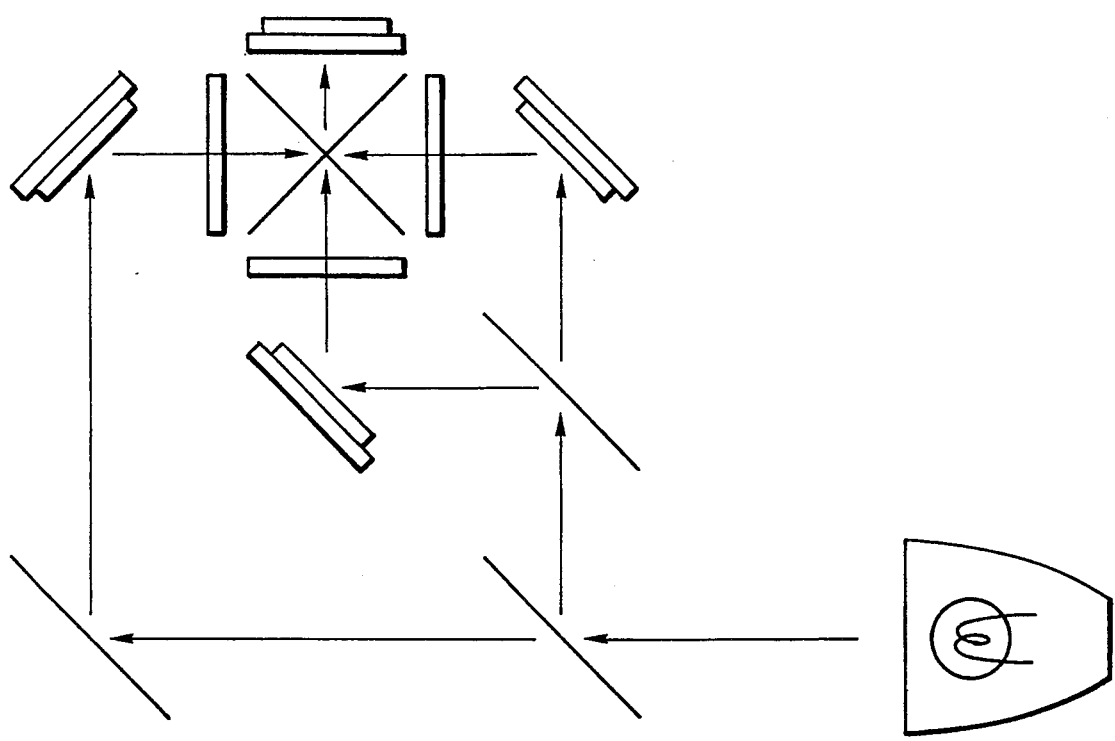

FIG. 30

FIRST DEVICE      211  212  213

106   PIXEL A1           ⎯⎯⎯⎯⎯|‾‾|   ON / OFF

107   PIXEL A2      |‾‾‾‾‾‾‾‾‾‾|   ON / OFF

108   PIXEL B1      ⎯⎯|‾‾‾‾‾‾‾|   ON / OFF

109   PIXEL B2      |‾‾|__|‾‾|   ON / OFF

SECOND DEVICES

218   FOR RED       |‾‾|⎯⎯⎯⎯⎯⎯   ON / OFF

219   FOR GREEN     ⎯⎯|‾‾|⎯⎯⎯   ON / OFF

220   FOR BLUE      ⎯⎯⎯⎯⎯|‾‾|   ON / OFF

LIGHT SOURSE

ELECTRO-OPTICAL DEVICE

BACKGROUND OF THE INVENTION

1. Field of the Invention

The present invention relates to electro-optical device such as display devices used for computers, word processors, etc., and those which display TV video signals sent from ground TV stations, satellite TV stations, cable TV stations, etc., or video signals delivered from picture recording systems (e.g., video deck, laser disc player, magneto-optical disc system, etc.). The electro-optical device of the present invention can also be used for the view-finder of a video camera.

2. Description of the Prior Art

Hitherto, the STN (Super Twist Nematic) type liquid crystal display has commonly been used for the display screen of a computer, a word processor, etc. Since the liquid crystal material of the STN type display has steep electro-optical characteristics in comparison to the TN (Twist Nematic) type liquid crystal display used formerly, it enables high-level time-division drive for a large amount of information, which is difficult to realize with the TN type liquid crystal display. Thus, the advent of the STN type liquid crystal display triggered the development of so-called "note" (i.e., portable) personal computers and word processors, which are now widespread. However, as the number of scanning lines is increased to perform the time division drive, it becomes difficult to ensure the required ratio of voltages applied to selected and non-selected scanning lines, respectively, resulting in a lowering in the display qualities, particularly contrast.

A typical conventional device that displays images processed from video signals sent from a ground TV station, a satellite TV station, a cable TV station, or a TV picture recording system (video deck, laser disc player, magneto-optical disc system, etc.) employs a method in which a fluorescent screen that forms a display screen is irradiated with electron beams in a vacuum tube, called Braun tube or CRT (Cathode-Ray Tube), thus causing the fluorescent screen to emit visible light.

At the beginning, display devices with screens having a diagonal dimension of 12 to 14 inches were in common use. Recently, however, large display devices with a screen size of 20 to 30 inches or more have appeared by the request of society.

When the diagonal dimension of a display screen is 30 inches, the depth is also about 30 inches, and the thickness of glass that forms the screen exceeds 1 centimeter in order to ensure the required strength.

Further, a system in which an image on a cathode-ray tube of high brightness is enlarged through an optical system and projected onto a screen has been proposed and already used for devices that have a large display area. The arrangement of this system is shown schematically in FIG. 1.

In the case of television receivers that use a cathode-ray tube, if the size of the display screen exceeds 30 inches, the overall weight is well over 100 kg. In an ordinary home, it is not easy to find a place to put a heavy object of more than 100 kg in weight. With such a heavy weight, the television receiver once installed is difficult to move by human power on such an occasion that the layout needs to be changed, which is an obstacle to the spread of wide-screen television receivers to ordinary homes.

To solve the problem of weight, projection television receivers have been proposed. However, the brightness per se of the enlarged screen is considerably low because of the limitation on the improvement in the brightness of the high-brightness cathode-ray tube, on which this type of television system is based. For this reason, the screen is rather dark, and since the screen is enlarged through an optical system, although the contrast ratio of the screen as seen from the front is high, that of the screen as seen from an oblique direction is exceedingly low in comparison to the cathode-ray tube type television receiver. However, the projection television receiver solves the problem of weight since its weight is about 50% of that of the cathode-ray tube type. The projection television 201 shown in FIG. 1 comprises a cathode-ray tube or liquid crystal display 204, a tuner 205, an optical system 203, a reflector 202, and a screen 206.

Recently, display devices that employ a thin-film transistor liquid crystal display using amorphous silicon as a display member in place of a cathode-ray tube have been proposed. FIG. 2 shows the structure of one of the proposed display devices. The relatively light weight of this type of display device, which is only about 30% of that of the cathode-ray tube type, has helped the spread of these devices to ordinary homes. However, the brightness of the display screen of this type of display device is low in comparison to the cathode-ray tube type. Although efforts have been made to solve the problem of low brightness by increasing the light intensity of the light source, if the light source intensity is increased, there is a lowering in the resistance of the thin-film transistors when in an "off" state due to a rise in temperature of the liquid crystal panel and the illumination with light, so that it is difficult to attain satisfactory display. FIG. 3 shows a typical conventional active matrix arrangement. For simplification of illustration, the arrangement is shown in the form a matrix of 2 rows and 2 columns. A plurality of gate lines G1 and G2 and a plurality of data lines D1 and D2 are disposed to intersect each other perpendicularly, and pixel display elements are provided at the intersections, respectively. Each pixel display element comprises a TFT portion 501 and a liquid crystal portion 502. Signals from peripheral circuits 506 and 507 are applied to the pixels to selectively turn on or off given pixels.

However, in actual use of these liquid crystal display devices, it is often that the output of the TFT 501, that is, the input voltage $V_{LC}$ to the liquid crystal 502 (hereinafter referred to as "liquid crystal potential"), fails to become "1" (High) when it should do so, and also fails to become "0" when required to do so. This problem is attributable to the fact that a switching element that applies a signal to a pixel, that is, the TFT 501, lacks symmetry in the characteristics thereof. In other words, the way in which the pixel electrode is charged and the way in which it is discharged are not in symmetry with respect to each other. The liquid crystal 502 operates as an insulator, and the liquid crystal potential ($V_{LC}$) is in a floating state when the TFT 501 is in an "off" state. In addition, since the liquid crystal 502 is equivalent to a capacitor, $V_{LC}$ is determined by the electric charge stored in it. When the resistance of the liquid crystal becomes relatively small at $R_{LC}$, or when a leakage occurs owing to the presence of dust or ionic impurities, or when $R_{GS}$ occurs due to a pinhole in the gate insulator of the TFT 501, the stored charge leaks, so that $V_{LC}$ becomes ambiguous. For this reason, no high yield can be attained for a liquid crystal display having 200,000 to 5,000,000 pixels on a single panel.

In addition, it is necessary in order to effect color display to use at least three active matrix display devices as display members, as shown in FIG. 2. Accordingly, the low yield is raised to the third power at least, resulting in a considerably low overall yield, and thus inviting a rise in the cost.

There is another type of display that uses a ferroelectric liquid crystal material, which was proposed by Clark Lagawall et al. FIG. 4 is a conceptual view of this type of liquid crystal display. Since a ferroelectric liquid crystal material has spontaneous polarization, when the liquid crystal layer is thinned to such an extent that it is unspiraled, a surface stable ferroelectric liquid crystal (SSFLC) state is attained, so that it is possible to obtain the memory effect that once an electric field is applied thereto, a transparent or opaque state continues even if the electric field is removed. By making use of this memory state, it is possible to realize a static drive similar to that in the case of the active matrix LCD using TFTs.

However, since the ferroelectric liquid crystal can have only two stable states, that is, transparent and opaque states, it is not suited for tonal display (gradation display) that is required as a result of diversification of information. Tonal display is essential particularly when these liquid crystal electro-optical devices are used for video purposes. To solve this problem, it is conventional practice to divide each unit pixel into a multiplicity of areal sections so that it comprises a plurality of dots to effect tonal display. For example, a method has been invented in which each unit pixel is divided into three sections in the areal ratios of 1:2:4 and the "on" and "off" states of these divided sections are combined to obtain 8 gradation levels. FIG. 5 (a) shows the electrode structure designed for tonal display with 2 gradation levels, and 5 (b) shows that for tonal display with 8 gradation levels.

With the prior art method, however, three data signals must be applied per unit pixel, so that the external circuit configuration becomes extremely complicated, resulting in a rise in the cost and a lowering in the yield at the time of connection of the external circuits. In addition, since the division of the unit pixels needs insulating sections between the neighboring electrodes, the aperture ratio lowers. For example, if a display screen in which unit pixels are arranged at a pitch 250 $\mu$m and with a gap of 25 $\mu$m is considered, when the unit pixels are not divided, the aperture ratio is 81%, whereas, when they are divided with the same gap, the aperture ratio lowers to 63%. In addition, owing to the division, the width of the thinnest electrodes 103 is 25 $\mu$m when the pitch and the gap are the same as the above. Thus, even when ITO that has a sheet resistance of not higher than 5 $\Omega$ is used to form a liquid crystal display of 1,000×1,000 pixels, electrodes that are disposed in the data line direction from one end to the other have a resistance of about 50 k$\Omega$. Accordingly, there is an intensity difference between the electric fields that are applied to the liquid crystals at two ends of each electrode, so that no uniform display can be performed. Thus, the prior art lacks practicability.

SUMMARY OF THE INVENTION

Under these circumstances, it is an object of the present invention to provide an electro-optical device capable of controlling the gradation even more practically.

According to the present invention, a matrix electro-optical device for display per se does not perform tonal display (gradation display), but the intensity of a light source for illumination is changed temporally to thereby enable tonal display.

According to the present invention, the light transmission factor (level) of a second electro-optical device is controlled as a means for temporally changing the intensity of the illuminating light source.

To enable the above-described tonal display, the present invention provides an electro-optical device comprising a first device and a second device, which are provided in an optical path extending between a light source and a screen for outputting a picture image (visual image) thereon, each of the devices including a pair of first and second substrates each having electrodes and leads formed thereon, which sandwich therebetween an electro-optical modulating layer, e.g. a liquid crystal layer.

The above-described liquid crystal layer may comprise a ferroelectric liquid crystal material. Also, the liquid crystal layer may comprise a mixture of a polymeric resin material and a liquid crystal material selected from the group consisting of a nematic liquid crystal material, a cholesteric liquid crystal material, and a smectic liquid crystal material.

For example, the first and second devices are liquid crystal display devices each having a matrix arrangement formed on a substrate in such a manner that each pixel is provided with a pair of complementary transistors, i.e., a P-channel thin-film transistor and an N-channel thin-film transistor, which are connected at their output terminals to the pixel. The second liquid crystal display device is characterized in that the light transmission factor changes with time rotationally in the ratios of approximately $2^0$ to $2^1$ to $2^2$ to ... to $2^n$ (n is an arbitrary number). As one example of the present invention, a projection television receiver is shown in FIG. 11. In the figure, reference numeral 30 denotes the first device, and 31 the second device. Reference numeral 32 denotes a light source lamp, 33 a screen, 34 a reflector, 35 an optical system for projection, and 36 a tuner and control section. Although liquid crystal display devices are employed as the devices 30 and 31, other display devices having light transmission properties may be employed. The present invention can be applied not only to the rear projector type as in the illustrated example but also to any type of projection apparatus, as a matter of course.

It is also possible to use the combination of the first and second devices as a display of a word processor, a computer, etc.

The first device that comprises a ferroelectric liquid crystal composition and a means for orienting the liquid crystal composition at least in an initial stage, which are sandwiched between a pair of first and second substrates each having electrodes and leads formed thereon, is arranged to perform tonal display with a set of three picture frames.

For simplification, the following description will be made by using light intensity data consisting of 3 bits. Since $2^3=8$, the 3-bit representation enables tonal display with 8 gradation levels. The first device is assumed to have pixels arranged in a matrix of 2×2, as shown in FIG. 6.

Table 1 below shows the way of tonal display in the case of employing the first device shown in FIG. 6, which shows gradation levels and the ON/OFF pattern of a set of three picture frames.

TABLE 1

| Gradation | | Transmitted light intensity ratio | | | Corresponding |
| --- | --- | --- | --- | --- | --- |
| | level | 1 | 2 | 4 | pixel |
| dark | G0 | 0 | 0 | 0 | A1 |
| ↑ | G1 | 1 | 0 | 0 | — |
| ↑ | G2 | 0 | 1 | 0 | — |
| ↑ | G3 | 1 | 1 | 0 | A2 |
| ↓ | G4 | 0 | 0 | 1 | — |
| ↓ | G5 | 1 | 0 | 1 | B1 |
| ↓ | G6 | 0 | 1 | 1 | — |
| light | G7 | 1 | 1 | 1 | B2 |

0...opaque
1...transparent

Assuming that 8 gradation levels are denoted by (G0, G1, G2, ... G7) toward the light side from the dark side and that display is effected with the pixel A1 106 at the level G0, the pixel A2 107 at the level G3, the pixel B1 108 at the level G5 and the pixel B2 109 at the level G7, as shown in Table 1, for the first picture frame the light intensity is set to 1 by changing the light transmission factor of the second device and the pixels on the first device are brought into the respective states: the pixel A1 is OFF (opaque); the pixel A2 is ON (transparent); the pixel B1 is ON (transparent); and the pixel B2 is ON (transparent).

For the second picture frame, the light intensity is set to 2 by changing the light transmission factor of the second device, and the pixels on the first device are brought into the respective states: the pixel A1 is OFF (opaque); the pixel A2 is ON (transparent); the pixel B1 is OFF (opaque); and the pixel B2 is ON (transparent).

For the third picture frame, the light intensity is set to 4 by changing the light transmission factor of the second device and the pixels on the first device are brought into the respective states: the pixel A1 is OFF (opaque); the pixel A2 is OFF (opaque); the pixel B1 is ON (transparent); and the pixel B2 is ON (transparent).

Thus, tonal display with 8 gradation levels can be effected with a set of three picture frames by controlling the first and second devices in the manner described above. Although in the foregoing the 3-bit (n=3) representation is used, it should be noted that it is not necessarily exclusive and that n-bit (n=an arbitrary natural number) representation may be employed.

Further, the present invention provides a color television receiver comprising at least one first liquid crystal display device that displays television pictures, and at least three optical shutters which serve as means for temporally changing the color of light, the optical shutters being disposed in an optical path defined by a light source of the display device and a place where the picture images are projected. As the optical shutters, a ferroelectric liquid crystal composition is employed.

More specifically, a color single picture frame is comprised of at least three picture frames which display three primary colors, i.e., red, green and blue, respectively, thereby enabling color display by the time-series mixture of light rays entering the human eyes.

It is known that if a time-varying image comprises 30 or more frames per second, the average human eyes sense it as a natural one, although the ability of the human eyes differs among individuals. Accordingly, color display can be effected by displaying the above-described three picture frames, that is, the red, green and blue frames, sequentially in 1/30 second.

In the case of the above-described display, the length of time that one color is displayed is 1/(30 frames×3 colors) second=11.1111 msec, that is, about 11 msec. When the display quality is taken into consideration, it is necessary to use optical shutters by which a change in the light transmission factor (from light to dark or from dark to light) occurs within several % of the above-described display time.

For this reason, the color television receiver of the present invention employs a ferroelectric liquid crystal composition as the optical shutters. The periods of transmittivity changing time of ferroelectric liquid crystal material, twisted nematic liquid crystal material, guest-host type liquid crystal material, electrically controlled birefringence type liquid crystal material, phase change type liquid crystal material, and dynamic scattering type liquid crystal material are 20 to 500 μsec, 20 to 150 msec, 70 to 300 msec, 10 to 200 msec, 10 to 200 msec, and 10 to 150 msec, respectively. As will be clear from this fact, a ferroelectric liquid crystal composition is most suitable for the optical shutters.

According to the present invention, it is only necessary to use one liquid crystal device of low yield, i.e., the first liquid crystal device, thus attaining an improvement in the overall yield. Since a ferroelectric liquid crystal composition is employed as the optical shutters, the color changes can be effected sharply, so that the picture quality can be improved.

In addition, the present invention provides a color television receiver wherein a matrix liquid crystal device for display per se is not arranged to effect tonal display, but the color and intensity of light entering the driving panel are changed with time, thereby enabling tonal display. More specifically, two different kinds of liquid crystal devices, that is, a first device and a second device, are prepared, and tonal display is effected not by making a matrix liquid crystal device (the first device) for display perform tonal display but by temporally changing the color and intensity of light entering the driving panel (the first device) with the second liquid crystal device used as a shutter.

For simplification, the following description will be made by using light intensity levels represented by 3-bit data and light rays of three colors. As shown in FIG. 7, the color television receiver of the present invention comprises a first device 40 including a pair of first and second substrates each having electrodes and leads formed thereon, which sandwich therebetween a ferroelectric liquid crystal composition and a means for orienting the liquid crystal composition at least in an initial stage, and three second devices 41 each including a pair of first and second substrates each having electrodes and leads formed thereon, which sandwich therebetween a ferroelectric liquid crystal composition and a means for orienting the liquid crystal composition at least in an initial stage, thereby effecting color tonal display with a set of nine picture frames.

With 9-bit representation, R (red), G (green) and B (blue) can be displayed with 8 gradation levels each, so that a total of 512 colors can be displayed. It is assumed that pixels are arranged on a screen in a matrix of 2×2, as shown in FIG. 6.

Assuming that the 8 gradation levels for each of the three colors, i.e., R, G and B, are denoted by R0 to R7, G0 to G7, and B0 to B7 toward the light side from the dark side and that display is effected with the pixel A1 106 at the levels R2, G0 and B5, the pixel A2 107 at the levels R5, G7 and B0, the pixel B1 108 at the levels R7, G1 and B3, and the pixel B2 109 at the levels R0, G5 and B2, the corresponding pixels on the first device are ON/OFF controlled according to the timing shown in FIG. 8 and, at the same time, the average transmission factor of each second device is changed, as shown in FIG. 8, thereby attaining color tonal display.

If the number of driving panels (first devices) is increased to three, it is possible to form an apparatus having an arrangement such as those shown in FIGS. 9 and 10. In any case, the matrix liquid crystal device for display per se is not arranged to perform tonal display, but the color and intensity of light entering the driving panel (the matrix liquid crystal device for display) are changed with time, thereby realizing tonal display.

The second devices may be arranged to change not the light transmission factor but the light reflectance.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 5(b) shows an electrode structure designed for tonal display with 8 gradation levels;

FIG. 20 shows the arrangement of a television receiver according to third and fourth embodiments of the present invention;

FIG. 22 shows the arrangement of a modification of the fifth embodiment;

FIG. 30 is a time chart showing the operation of the eighth embodiment.

DESCRIPTION OF THE PREFERRED EMBODIMENTS

The present invention will be described below in detail with reference to the accompanying drawings.

Embodiment 1

Figure 12:
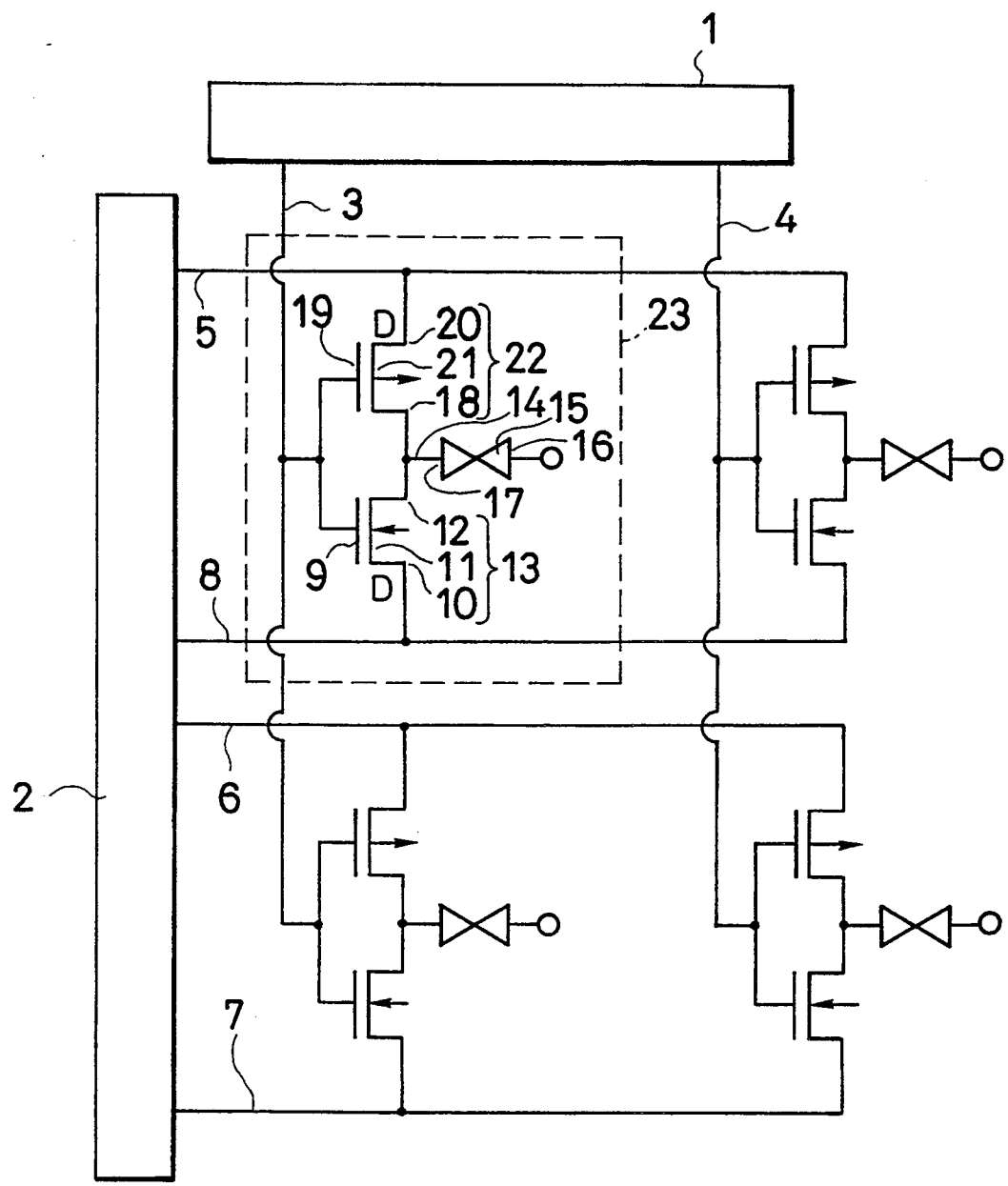
FIG. 12 shows a circuit configuration employed in a first embodiment of the present invention.
Figure 13:
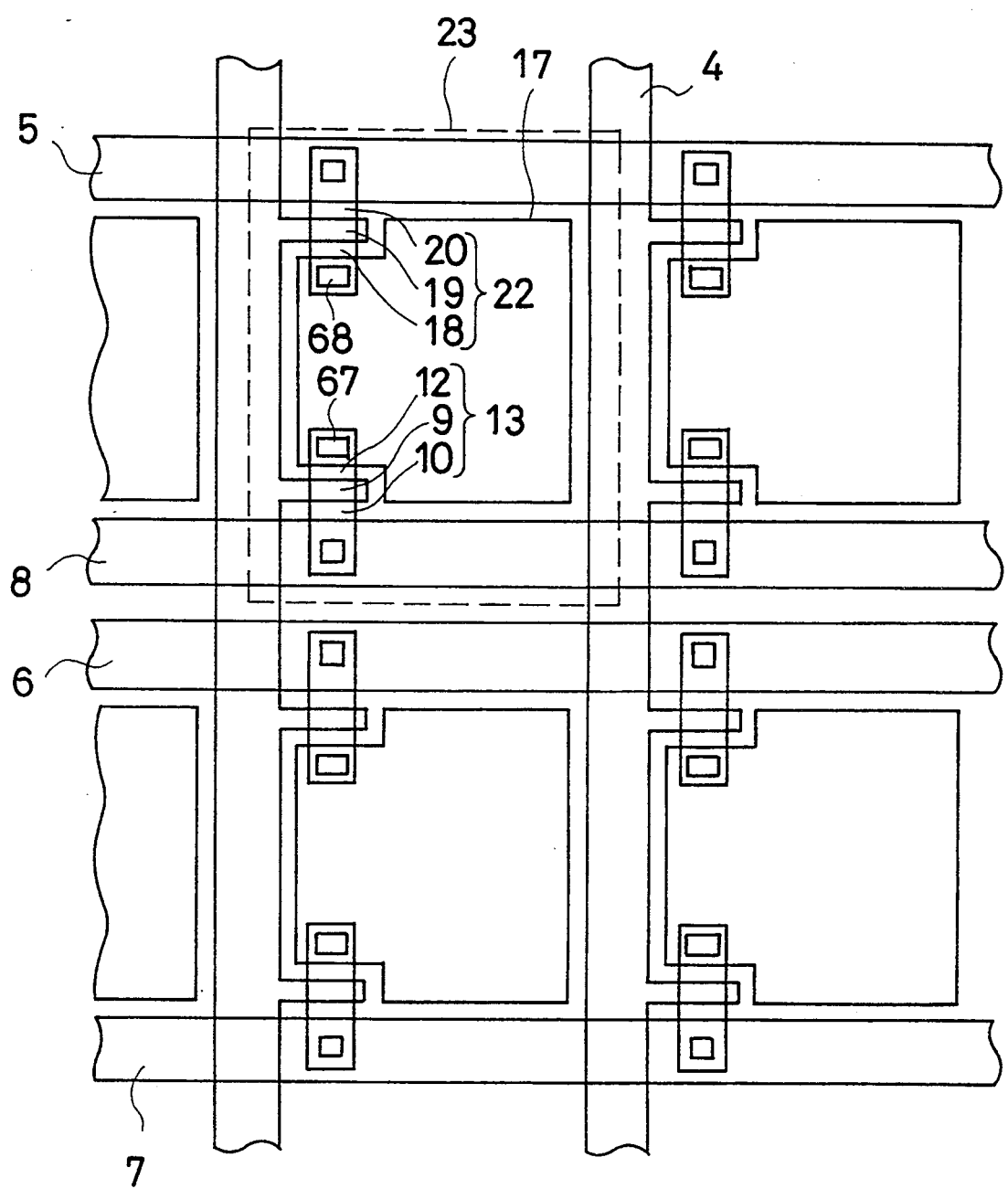
FIG. 13 shows an actual arrangement of electrodes and other constituent elements corresponding to the circuit configuration shown in FIG. 12.
Figure 14:
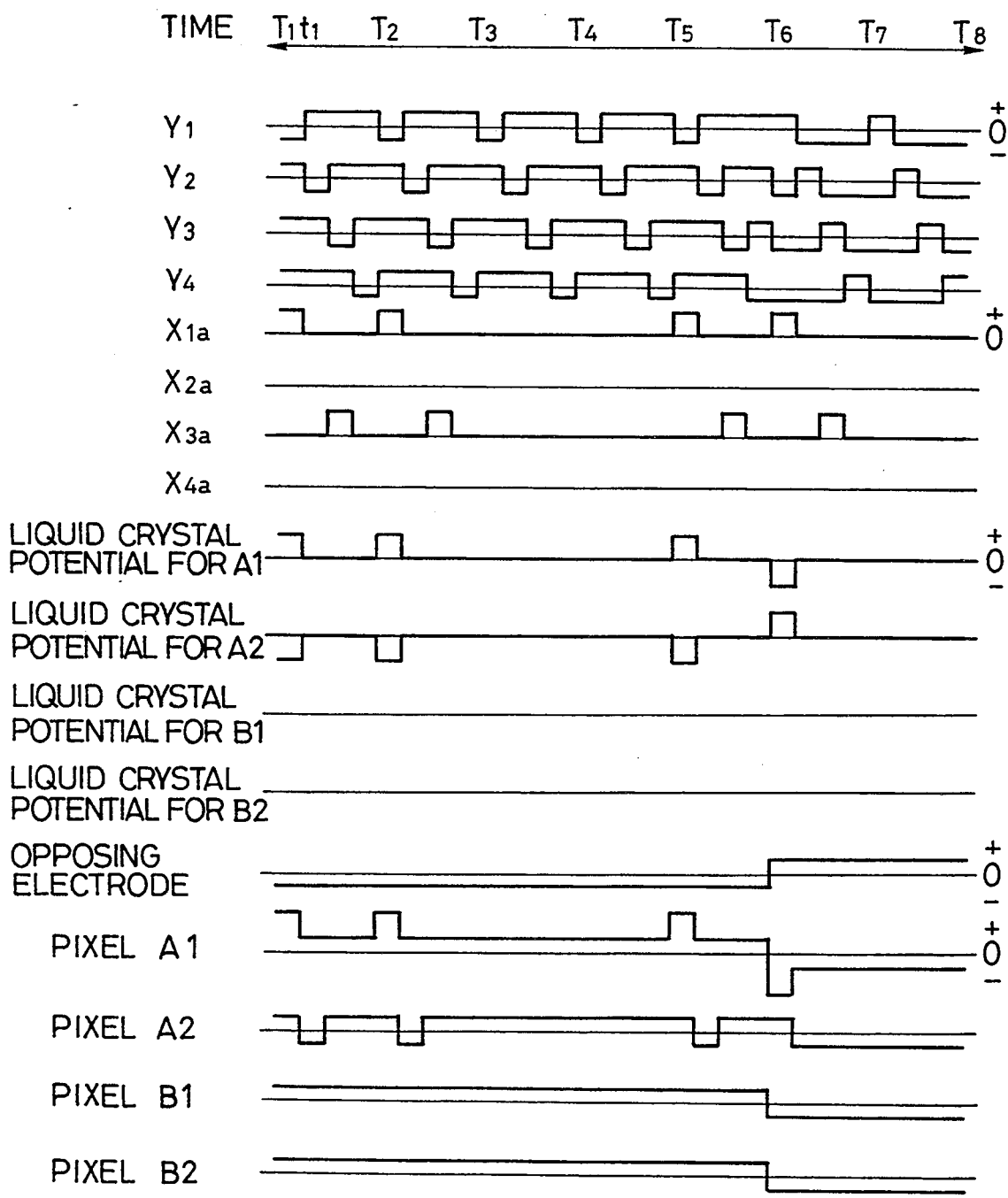
FIG. 14 shows the waveforms of driving signals used in the embodiment.

In this embodiment, an active matrix liquid crystal device using thin-film transistors is employed as the first device. First, the process of producing the first device, that is, a liquid crystal display device, will be explained. Here, a liquid crystal display device employing a ferroelectric liquid crystal (FLC) material will be described by using a liquid crystal device that employs a circuit configuration, i.e., a buffer type circuit configuration, such as that shown in FIG. 12. FIG. 13 shows an actual arrangement of electrodes and other constituent elements corresponding to the circuit configuration shown in FIG. 12. In these figures, only a portion of the arrangement that corresponds to a matrix of 2×2 is shown for simplification of illustration. The waveforms of actual driving signals are shown in FIG. 14. This will also be explained with signal waveforms in the case of a matrix of 4×4 for simplification of illustration.

First, a liquid crystal display device that is used in this embodiment will be described with reference to FIG. 15.

Referring to FIG. 15 (A), on inexpensive glass 50 capable of enduring a heat treatment at not higher than 700° C., e.g., about 600° C., a silicon oxide film was formed to a thickness of 1,000 to 3,000 Å as a blocking layer 51 by using magnetron RF (high frequency) sputtering method under the process conditions that the atmosphere was 100% oxygen, the film growth temperature 15° C., the output 400 to 800 W, and the pressure 0.5 Pa. The film growth rate was 30 to 100 Å/minute when quarts or single crystal silicon was employed as a target.

A silicon film was formed on the blocking layer 51 by LPCVD (Low-Pressure Chemical Vapor Deposition) method, sputtering method, or plasma CVD method. In the case of low-pressure CVD, the film was grown by supplying disilane ($Si_2H_6$) or trisilane ($Si_3H_8$) to a CVD system at a temperature 100° to 200° C. lower than the crystallization temperature, i.e., 450° to 550° C., e.g., 530° C., to grow the film. The pressure inside the reaction furnace was 30 to 300 Pa. The film growth rate was 50 to 250 Å/minute. To control the threshold voltages (Vth) of NTFT and PTFT to substantially the same level, boron may be added to the film by using diborane at a concentration of $1 \times 10^{15}$ to $1 \times 10^{18}$ cm$^{-3}$ during the film formation.

In the case of sputtering method, sputtering was carried out in an atmosphere of argon mixed with 20 to 80% hydrogen by using single crystal silicon as a target, with the back pressure before sputtering set below $1 \times 10^{-5}$ Pa. For example, the atmosphere consisted of 20% argon and 80% hydrogen. The film growth temperature was 150° C., the frequency 13.56 MHz, the sputtering output 400 to 800 W, and the pressure 0.5 Pa.

In the case of formation of the silicon film by plasma CVD method, the temperature was set at 300° C., for example, and monosilane ($SiH_4$) or disilane ($Si_2H_6$) was employed. The source material was introduced into a PCVD system to grow a film under the application of a high-frequency electric power of 13.56 MHz.

It is preferable that the film formed by these methods should have an oxygen concentration of not higher than $5 \times 10^{21}$ atoms·cm$^{-3}$. If the oxygen concentration is excessively high, the film is difficult to crystallize, and the annealing temperature must be raised or the annealing time must be lengthened. If the oxygen content is excessively low, the leak current in an "off" state is increased by back light. Therefore, the oxygen concentration range was set in the range of from $4 \times 10^{19}$ to $4 \times 10^{21}$ atoms·cm$^{-3}$. The hydrogen concentration was $4 \times 10^{20}$ atoms·cm$^{-3}$, which was 1 atom % in comparison to the silicon concentration when assumed to be $4 \times 10^{22}$ atoms·cm$^{-3}$. It is also possible to set the oxygen concentration in source and drain regions to not higher than $7 \times 10^{19}$ atoms·cm$^{-3}$, preferably not higher than $1 \times 10^{19}$ atoms·cm$^{-3}$, so as to promote crystallization in these regions, and to add oxygen only to channel forming regions of TFTs that constitute pixels by ion implantation so that the oxygen concentration is $5 \times 10^{20}$ to $5 \times 10^{21}$ atoms·cm$^{-3}$. At this time, it is effective for achieving a high-frequency operation to minimize the amount of oxygen mixed in TFTs that constitute peripheral circuits to thereby provide a maximal carrier mobility because no light is applied to these TFTs.

After the amorphous silicon film was formed to a thickness of 500 to 5,000 Å, e.g., 1,500 Å, it was subjected to intermediate-temperature heat treatment in a nonoxidizing atmosphere, for example, hydrogen atmosphere, for 12 to 70 hours at 450° to 700° C., for example, 600° C. Since the amorphous silicon oxide film is formed on the surface of the substrate under the silicon film, no particular nuclei are present, and the whole silicon film is annealed uniformly by the heat treatment. In other words, when grown, the silicon film is amorphous and has hydrogen simply mixed therein.

By the annealing process, the silicon film shifts from the amorphous state to a highly ordered state in which part of the silicon film shows a crystalline state. In particular, regions which are relatively highly ordered after the growth of the silicon film tend to crystallize. However, since these regions are bonded to each other by silicon atoms which are present therein, the silicon atoms attract each other. Laser Raman spectroscopy reveals that there is a peak shifted toward the low frequency side from the peak of single crystal silicon, that is, 522 cm$^{-1}$. When calculated from the half-width, the apparent particle diameter is 50 to 500 Å, so that the film seems to be microcrystalline. In actuality, however, there are a large number of high crystalline regions, which have a cluster structure, and the clusters are anchored to each other by silicon atoms, thus enabling formation of a semi-amorphous film.

As a result, a film having substantially no grain boundary is obtained. Since carriers can move easily from one cluster to another through the anchored portion, the carrier mobility is higher than in the case of polycrystalline silicon where grain boundaries are definitely present. That is, hole mobility ($\mu h$)=10 to 200 cm$^2$/VSec and electron mobility ($\mu e$)=15 to 300 cm$^2$/VSec are obtained.

On the other hand, if the film is made polycrystalline by high-temperature annealing at 900° to 1,200° C., segregation of impurities in the film occurs because of solid phase growth from nuclei, resulting in an increase in the contents of impurities such as oxygen, carbon, nitrogen, etc. in the grain boundaries. Accordingly, although the mobility in the crystals is high, the movement of carriers is obstructed by barriers formed by the grain boundaries. As a result, no mobility higher than 10 cm$^2$/VSec can readily be obtained under the actual circumstances. For this reason, in this embodiment a silicon semiconductor having a semi-amorphous or semi-crystal structure is employed.

On the silicon film, a silicon oxide film was formed as a gate insulator to a thickness of 500 to 2,000 Å, for example, 1,000 Å. This film was formed under the same conditions as those for the silicon oxide film serving as a blocking layer. A small amount of fluorine may be added to the grown film to fix sodium ions.

On the silicon oxide film was formed a silicon film containing phosphorus at a concentration of 1 to $5 \times 10^{21}$ cm$^{-3}$ or a multilayer film comprising this silicon film and molybdenum (Mo), tungsten (W), MoSi$_2$ or WSi$_2$ formed thereon. This film was patterned with a second photomask ② to obtain a structure such as that shown in FIG. 15(B). Thus, a gate electrode 9 for PTFT and a gate electrode 19 for NTFT were formed. For example, as a gate electrode with a channel length of 10 μm, a multilayer film was constituted of phosphorus-doped silicon formed to a thickness of 0.2 μm and molybdenum formed thereon to a thickness of 0.3 μm. Referring to FIG. 15(C), a photoresist 57 was formed by using a photomask ③, and boron was added to source and drain regions 10 and 12 for PTFT at a dose of 1 to $5 \times 10^{15}$ cm$^{-2}$ by ion implantation. Next, as shown in FIG. 15(D), NTFT was formed by using a photomask ④. To form source and drain regions 20 and 18 for NTFT, phosphorus was added at a dose of 1 to $5 \times 10^{15}$ cm$^{-2}$ by ion implantation.

These processes were carried out through the gate insulator 54. However, in the step shown in FIG. 15(B), after the silicon oxide on the silicon film removed with the gate electrodes 9 and 19 used as masks, boron and phosphorus may be introduced directly into the silicon film by ion implantation.

Next, annealing was carried out again for 10 to 50 hours at 600° C. The source and drain regions 10 and 12 of PTFT were formed into P+ type regions, while the source and drain regions 20 and 18 of NTFT were formed into N+ regions by activating impurities. In addition, under the gate electrodes 9 and 19, channel forming regions 11 and 21 were formed as semi-amorphous semiconductor regions.

Thus, although a self-alignment method is employed, C/TFT can be formed without heating at 700° C. or higher in any of the steps in the process. Accordingly, it is unnecessary to employ a costly substrate, e.g., quartz, as a substrate material. Thus, the process is very suitable for the liquid crystal display device with a large number of pixels according to the present invention.

Figure 15A:
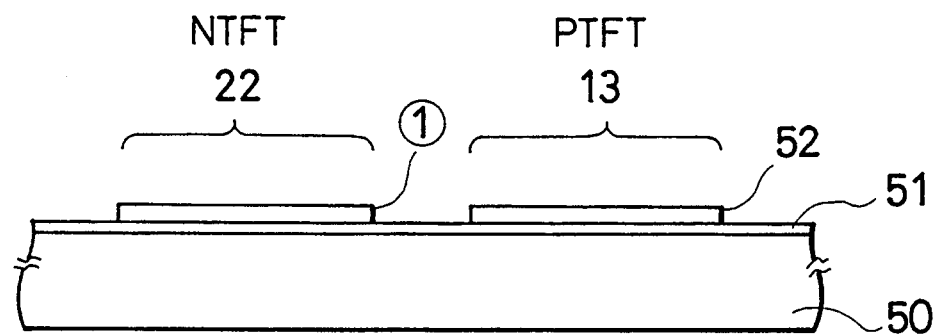
FIGS. 15(a) to 15(f) show a process for producing a liquid crystal display device used in the embodiment.
Figure 15B:
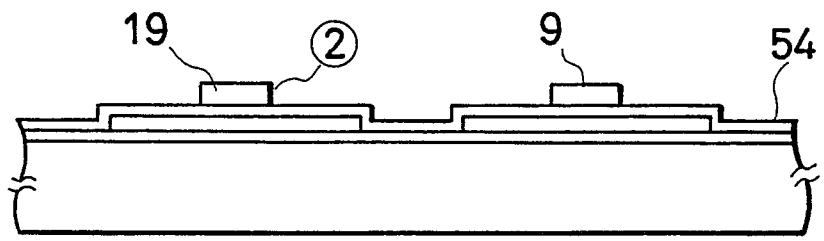
Figure 15C:
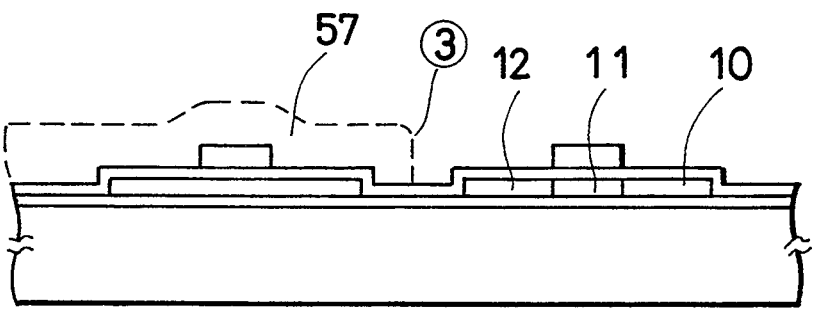
Figure 15D:
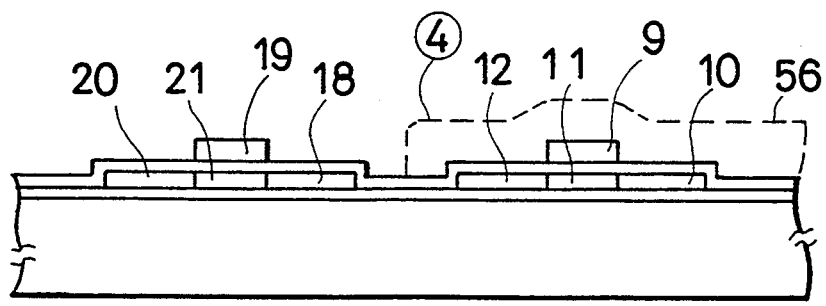

In this embodiment, thermal annealing was carried out twice, i.e., in the steps shown in FIGS. 15(A) and 15(D). However, the annealing process in the step shown in FIG. 15(A) may be omitted depending on the characteristics desired, and the annealing process in the step shown in FIG. 15(D) may be used for the two purposes to shorten the time required for the manufacture.

Figure 15E:
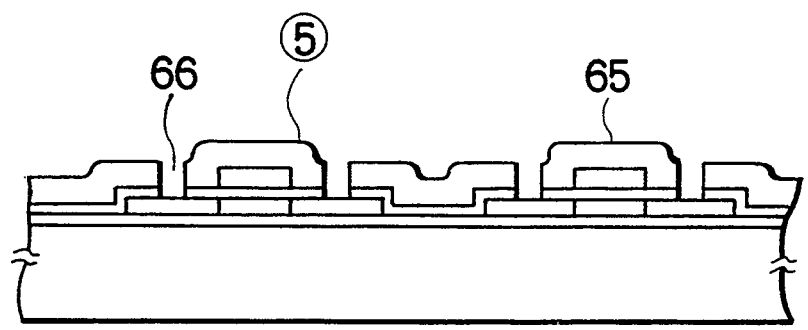

Referring next to FIG. 15(E), an interlayer insulator 65 was formed from a silicon oxide film by the above-described sputtering method. This silicon oxide film may also be formed by LPCVD, photo-assisted CVD, or atmospheric pressure CVD. For example, the silicon oxide film was formed to a thickness of 0.2 to 0.6 $\mu$m, and thereafter openings 66 for electrodes were formed by using a photomask ⑤. Then, the whole surface was coated with aluminum by sputtering, and leads 71 and 72 and contacts 67 and 68 were formed by using a photomask ⑥. Thereafter, the surface was coated with a leveling organic resin material 69, e.g., a light-transmitting polyimide resin material, and then electrode contact holes were formed by using a photomask ⑦.

Figure 15F:
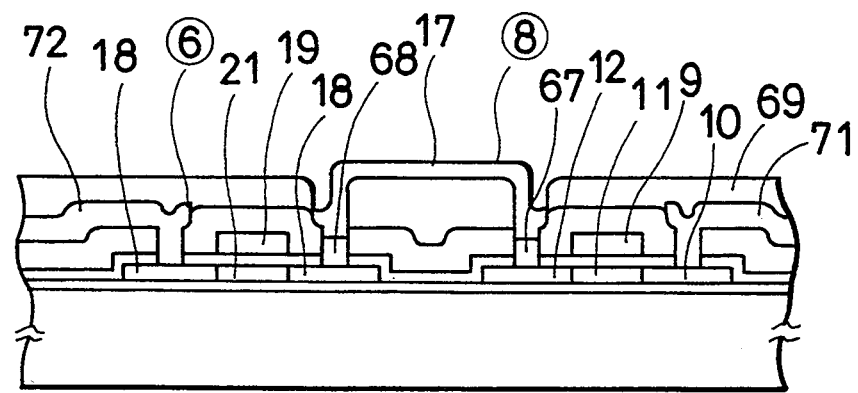

Then, as shown in FIG. 15(F), a transparent pixel electrode 17 of the liquid crystal device is formed by forming ITO (indium tin oxide) film by sputtering and subsequently etching the ITO film by using a photomask ⑧. In FIG. 15(F), two complementary TFTs, i.e. the PTFT 13 and the NTFT 22, are connected to the transparent pixel electrode 17 at their output terminals. The ITO was formed in the temperature range of from room temperature to 150° C. and annealed in an oxygen atmosphere or in the air at 200° to 400° C.

In this way, the PTFT 13, the NTFT 22 and the pixel electrode 17 of transparent conductor film were formed on the same glass substrate 50. The TFTs thus obtained had the following characteristics: The mobility and Vth of the PTFT were 20 (cm$^2$/Vs) and −5.9 (V), respectively; and the mobility and Vth of the NTFT were 40 (cm$^2$/Vs) and 5.0 (V), respectively.

The above-described process is the same regardless of the type of device, i.e., whether it is the buffer type or the inverter type, as a matter of course. Thus, a first substrate was obtained according to the method described above.

In the meantime, a transparent electrode was provided over substantially the whole surface of a substrate, and a polyimide solution diluted with NMP (N-methyl-2-pyrrolidone) was printed on the transparent electrode by offset printing. Thereafter, the substrate was burned at 50° C. and then burned for 1 hour in nitrogen at 280° C. before being subjected to rubbing, thereby forming a means for initially orienting a liquid crystal composition, and thus obtaining a second substrate.

A ferroelectric liquid crystal composition was disposed between the first and second substrates. Further, particles made of silicon oxide and having a diameter of 2.5 $\mu$m were dispersed between the first and second substrates at a rate of 200 particles per mm$^2$. The periphery of the resulting sandwich structure was fixed with an epoxy resin material to obtain a first device.

The following is a description of the second device.

A first substrate having a plurality of electrodes and leads formed thereon was prepared, together with a second substrate having a transparent electrode provided over substantially the whole surface thereof, the transparent electrode being printed with a polyimide solution diluted with NMP (N-methyl-2-pyrrolidone) by offset printing, the second substrate then being burned at 50° C. and subsequently burned for 1 hour in nitrogen at 280° C. before being subjected to rubbing, thereby forming a means for initially orienting a liquid crystal composition. A ferroelectric liquid crystal composition was disposed between the first and second substrates and particles made of silicon oxide and having a diameter of 2.5 $\mu$m were dispersed between the first and second substrates at a rate of 200 particles per mm$^2$. The periphery of the resulting sandwich structure was fixed with an epoxy resin material to obtain a second device.

Figure 16:
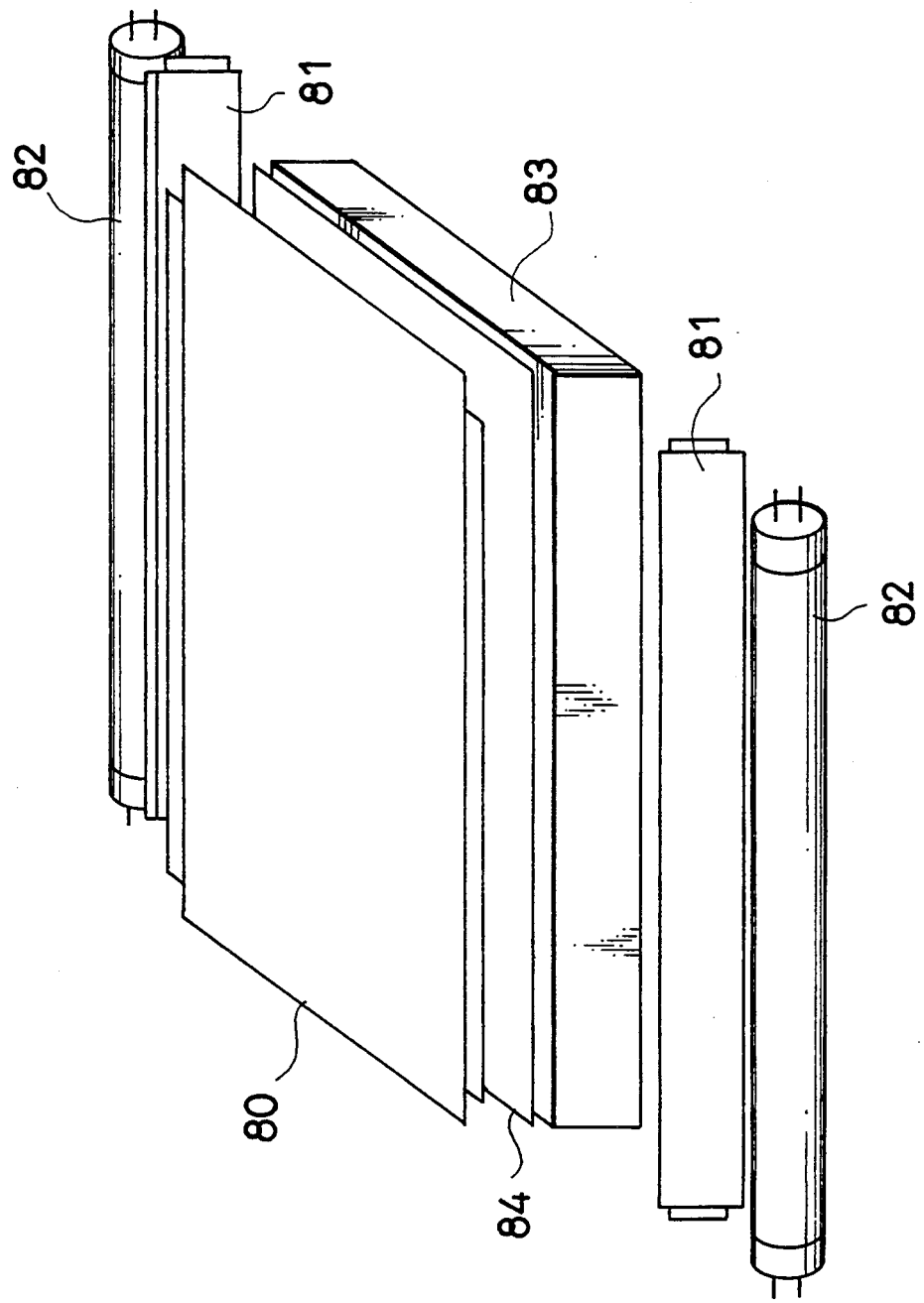
FIG. 16 is a perspective view of an electro-optical apparatus according to the embodiment.

The first device 80, the second devices 81, light sources 82, a light guide plate 83, and a diffusing plate 84 were installed as shown in FIG. 16 to obtain an electro-optical apparatus.

The way of driving this electro-optical apparatus will be explained below.

The first device prepared in this embodiment has a pixel arrangement comprising 640 pixels breadthwise and 480 pixels lengthwise, and a signal for writing for 23.15 $\mu$sec is applied to 480 leads in the scanning direction. Accordingly, one picture frame has a period of 11.11 msec, and a set of three picture frames has 33.33 msec.

The second device was arranged such that during the first period ¼ of all the electrodes were ON to set the intensity of the transmitted light to ¼ of the highest level; during the second period 2/4 of all the electrodes were ON to set the intensity of the transmitted light to 2/4 of the highest level; and during the third period all the electrodes were ON to set the transmitted light intensity to the highest level.

Thus, it is possible to realize tonal display with 8 gradation levels. It has also been confirmed that it is possible to effect tonal display with 16 gradation levels by using a set of four picture frames in a similar way.

Embodiment 2

In this embodiment, a display device employing a simple matrix is used as a first device.

On a soda-lime glass substrate with a thickness of 1.1 mm and having a silicon oxide film of 1,000 Å formed on the surface by sputtering, ITO (indium tin oxide) was formed to a thickness of 1,100 Å by DC sputtering method. Thereafter, 640 parallel electrodes and leads were formed by using photolithographic technique to obtain a first substrate. In the meantime, on a soda-lime glass substrate with a thickness of 1.1 mm and having a silicon oxide film of 1,000 Å formed on the surface by sputtering, ITO (indium tin oxide) was formed to a thickness of 1,100 Å by DC sputtering method. Thereafter, 480 parallel electrodes and leads were formed by using photolithographic technique and then printed with a polyimide solution diluted with NMP (N-methyl-2-pyrrolidone) by offset printing. Thereafter, the substrate was burned at 50° C. and then burned for 1 hour in nitrogen at 280° C. before being subjected to rubbing, thereby forming a means for initially orienting a liquid crystal composition, and thus obtaining a second substrate.

A ferroelectric liquid crystal composition was disposed between the first and second substrates and particles made of silicon oxide and having a diameter of 2.5 μm were dispersed between the first and second substrates at a rate of 200 particles per $mm^2$, and the periphery of the resulting sandwich structure was fixed with an epoxy resin material to obtain a first device.

As to the second device, the same as that in the embodiment 1 was used.

The way of driving this electro-optical apparatus will be explained below.

Figure 17:
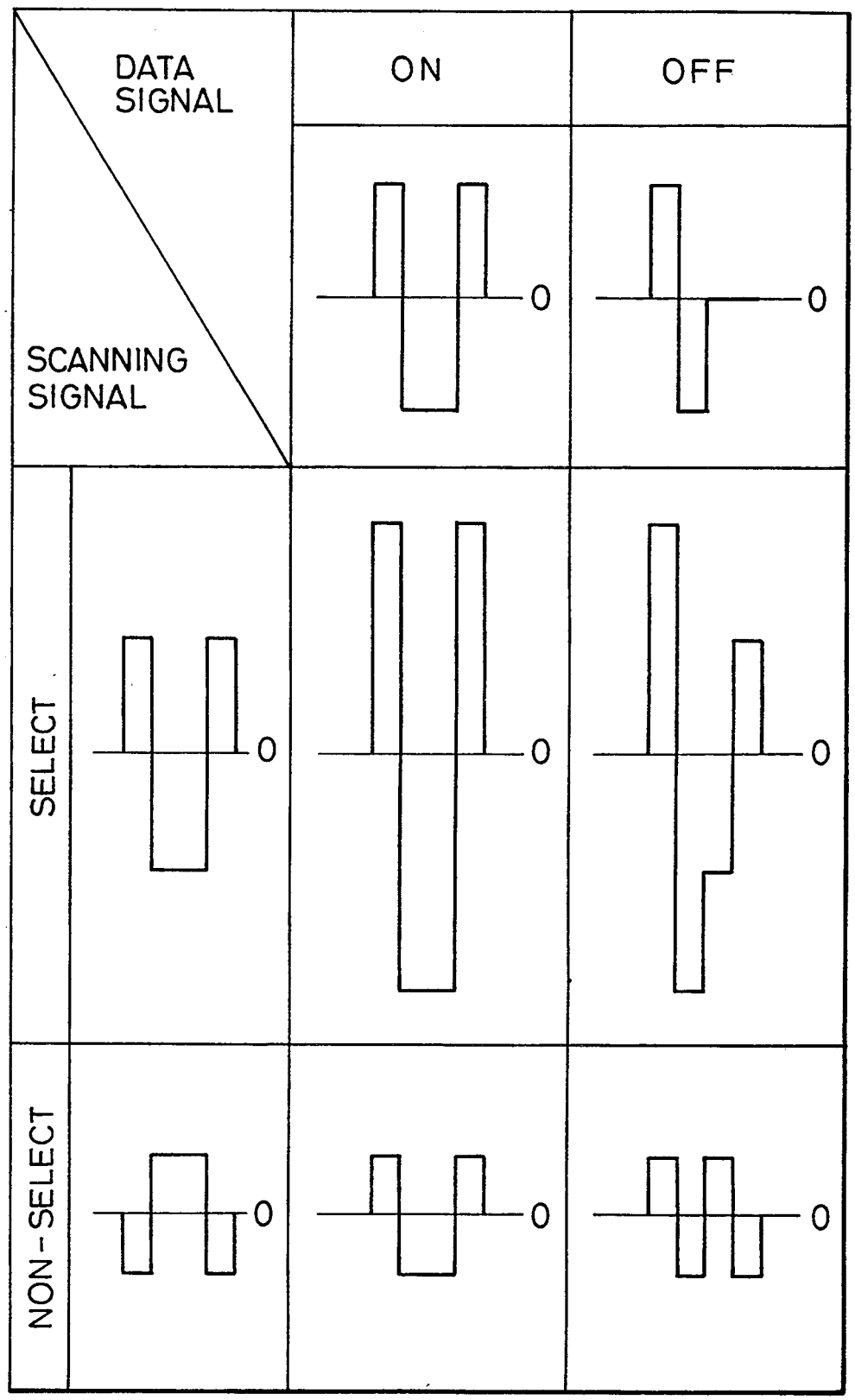
FIG. 17 shows signal waveforms for driving a liquid crystal display device as a first device in a second embodiment of the present invention.

The first device prepared in this embodiment has a pixel arrangement comprising 640 pixels breadthwise and 480 pixels lengthwise, and a signal for writing for 34.72 μsec is applied to 480 leads in the scanning direction. FIG. 17 shows signal waveforms for driving the liquid crystal display device as the first device. One picture frame has a period of 16.67 msec, and a set of two picture frames has 33.33 msec.

The second device was arranged such that during the first period $\frac{1}{2}$ of all the electrodes were ON to set the intensity of the transmitted light to $\frac{1}{2}$ of the highest level; and during the second period all the electrodes were ON to set the transmitted light intensity to the highest level.

Thus, it is possible to realize tonal display with 4 gradation levels.

In both the embodiments 1 and 2, when a liquid crystal display device was formed as a second device by using a liquid crystal device having nematic liquid crystal material dispersed in the network of a photo-setting modified acrylic resin material, it was possible to obtain favorable tonal display.

Embodiment 3

Figure 18:
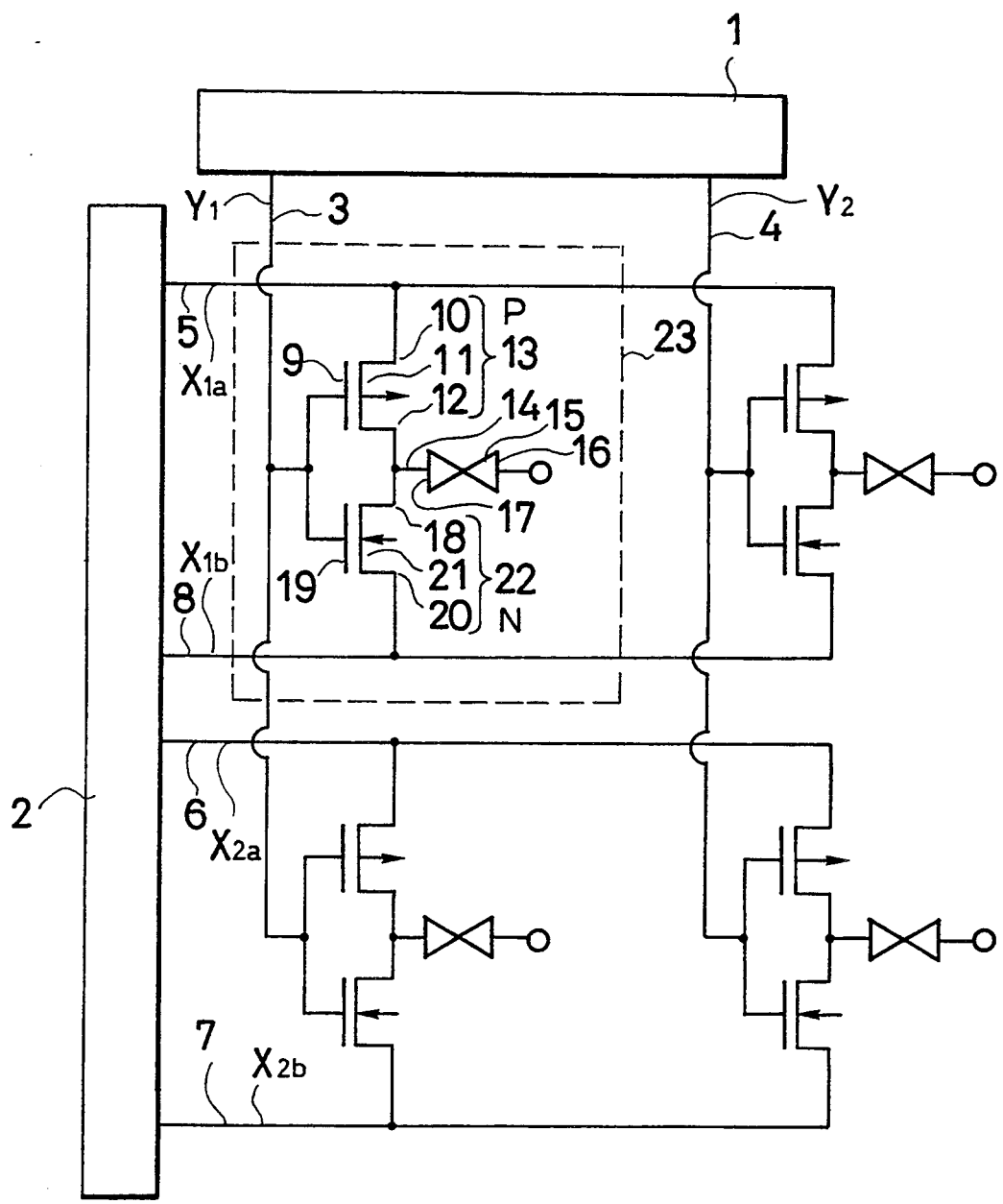
FIG. 18 shows a circuit configuration employed in a third embodiment of the present invention.
Figure 19:
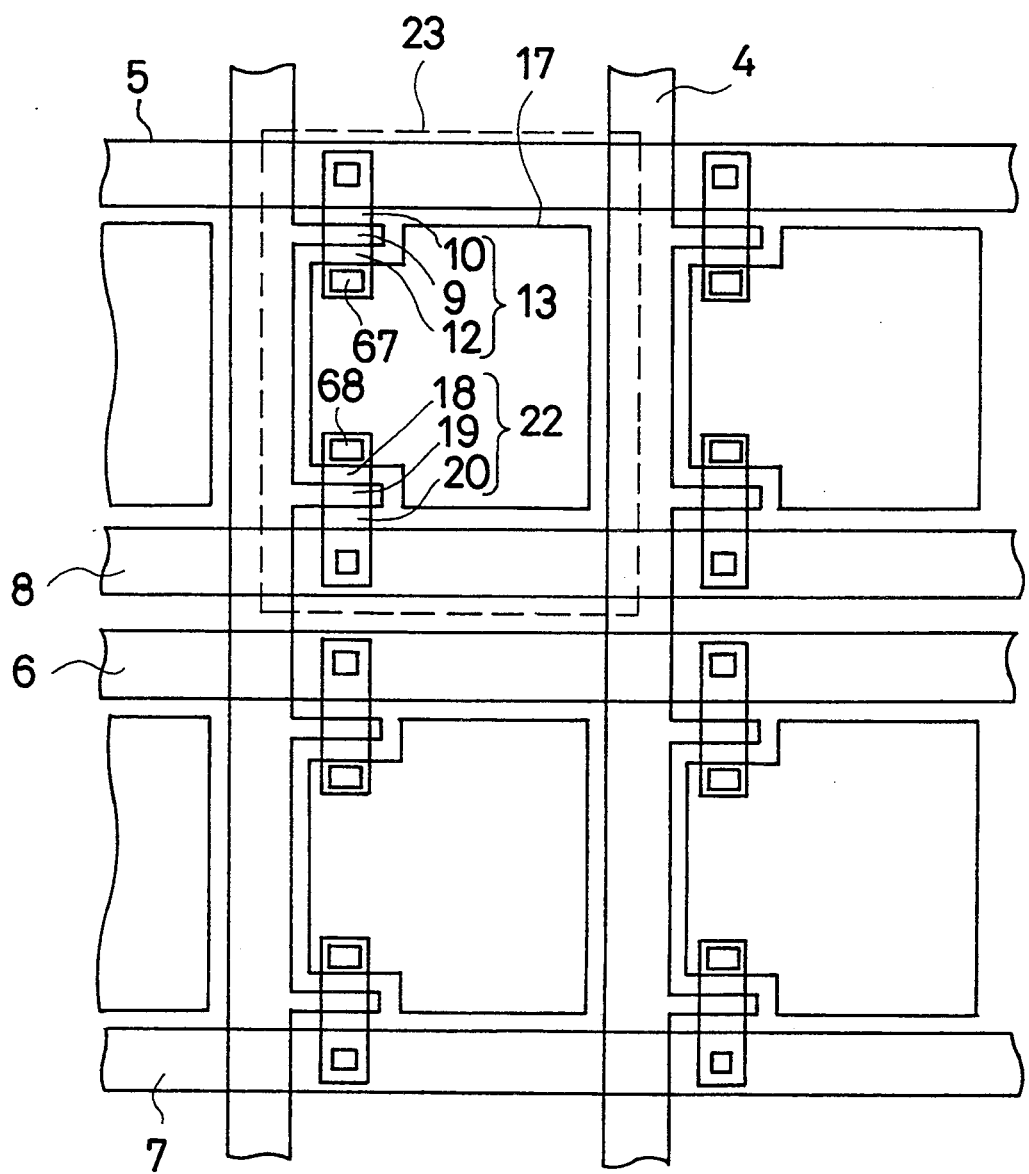
FIG. 19 shows an actual arrangement of electrodes and other constituent elements corresponding to the circuit configuration shown in FIG. 18.

The arrangement of the first device 180 in this embodiment and the method of producing the same are the same as those of the first device 80 in the embodiment 1 except that in this embodiment an inverter type circuit configuration is employed, as shown in FIG. 18. FIG. 19 shows an actual arrangement of electrodes and other constituent elements corresponding to the circuit configuration shown in FIG. 18. The second device 181 in this embodiment is the same as the second device 81 in the embodiment 1. The television receiver according to this embodiment comprises the first device 180, the second device 181, a light source 182, a screen 183, a mirror 184, an optical system 185, and a tuner 186, which are arranged as shown in FIG. 20.

Embodiment 4

The arrangement and production process of the first device 180 in this embodiment are the same as those of the first device in the embodiment 2. The arrangement and production process of the second device 181 in this embodiment are the same as those of the first device in the embodiment 3. The television receiver according to this embodiment comprises the first device 180, the second device 181, a light source 182, a screen 183, a mirror 184, an optical system 185, and a tuner 186, which are arranged as shown in FIG. 20.

Embodiment 5

The arrangement and production process of the first device 280 in this embodiment are the same as those of the first device in the embodiment 3.

The second device is formed as follows.

On a soda-lime glass substrate with a thickness of 1.1 mm and having a silicon oxide film of 1,000 Å formed on the surface by sputtering, ITO (indium tin oxide) was formed to a thickness of 1,100 Å by DC sputtering method. Thereafter, 100 parallel electrodes and leads were formed by using photolithographic technique to obtain a first substrate. In the meantime, on a soda-lime glass substrate with a thickness of 1.1 mm and having a silicon oxide film of 1,000 Å formed on the surface by sputtering, ITO (indium tin oxide) was formed to a thickness of 1,100 Å by DC sputtering method. Thereafter, a single parallel electrode and leads were formed by using photolithographic technique, and then printed with a polyimide solution diluted with NMP (N-methyl-2-pyrrolidone) by offset printing. Thereafter, the substrate was burned at 50° C. and then burned for 1 hour in nitrogen at 280° C. before being subjected to rubbing, thereby forming a means for initially orienting a liquid crystal composition, and thus obtaining a second substrate.

A ferroelectric liquid crystal composition was disposed between the first and second substrates and particles made of silicon oxide and having a diameter of 2.5 μm were dispersed between the first and second substrates at a rate of 200 particles per $mm^2$. The periphery of the resulting sandwich structure was fixed with an epoxy resin material to obtain a second device.

Figure 21A:
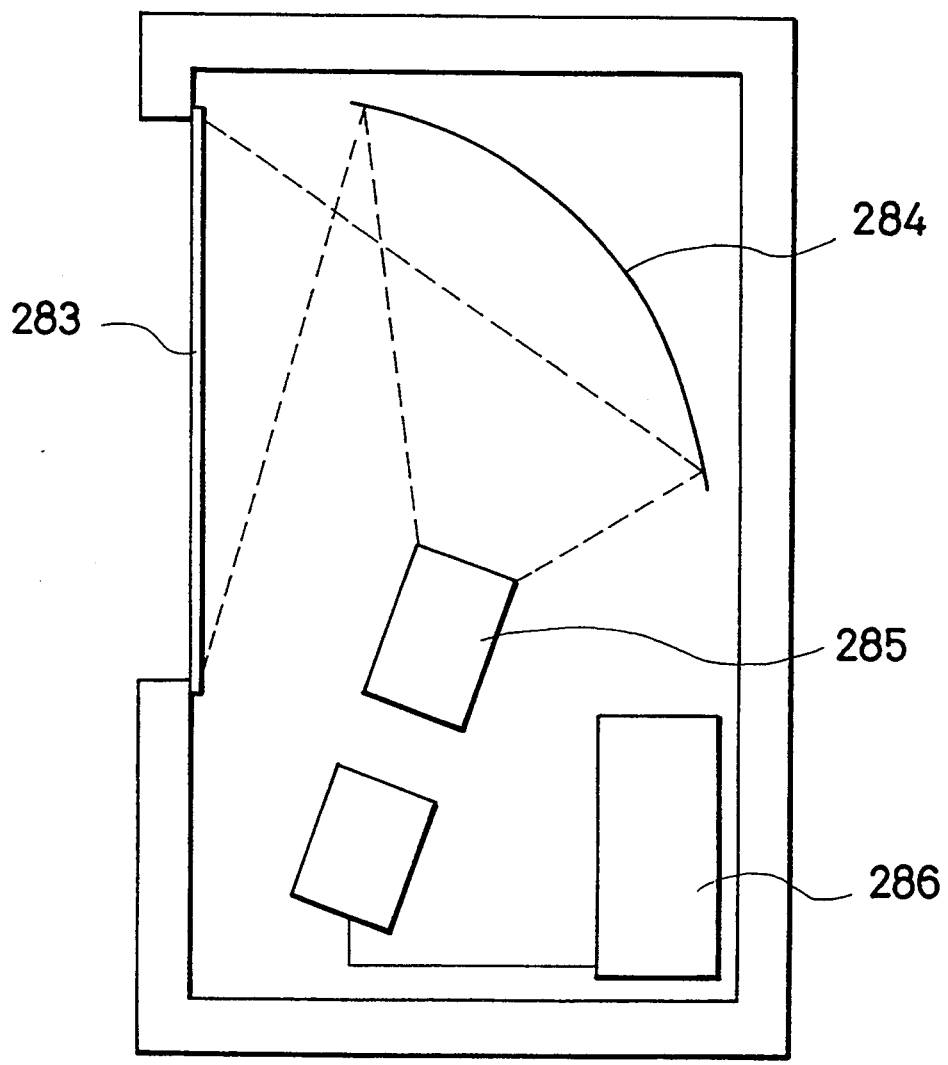
FIGS. 21(a) and 21(b) show the arrangement of a television receiver according to a fifth embodiment of the present invention.
Figure 21B:
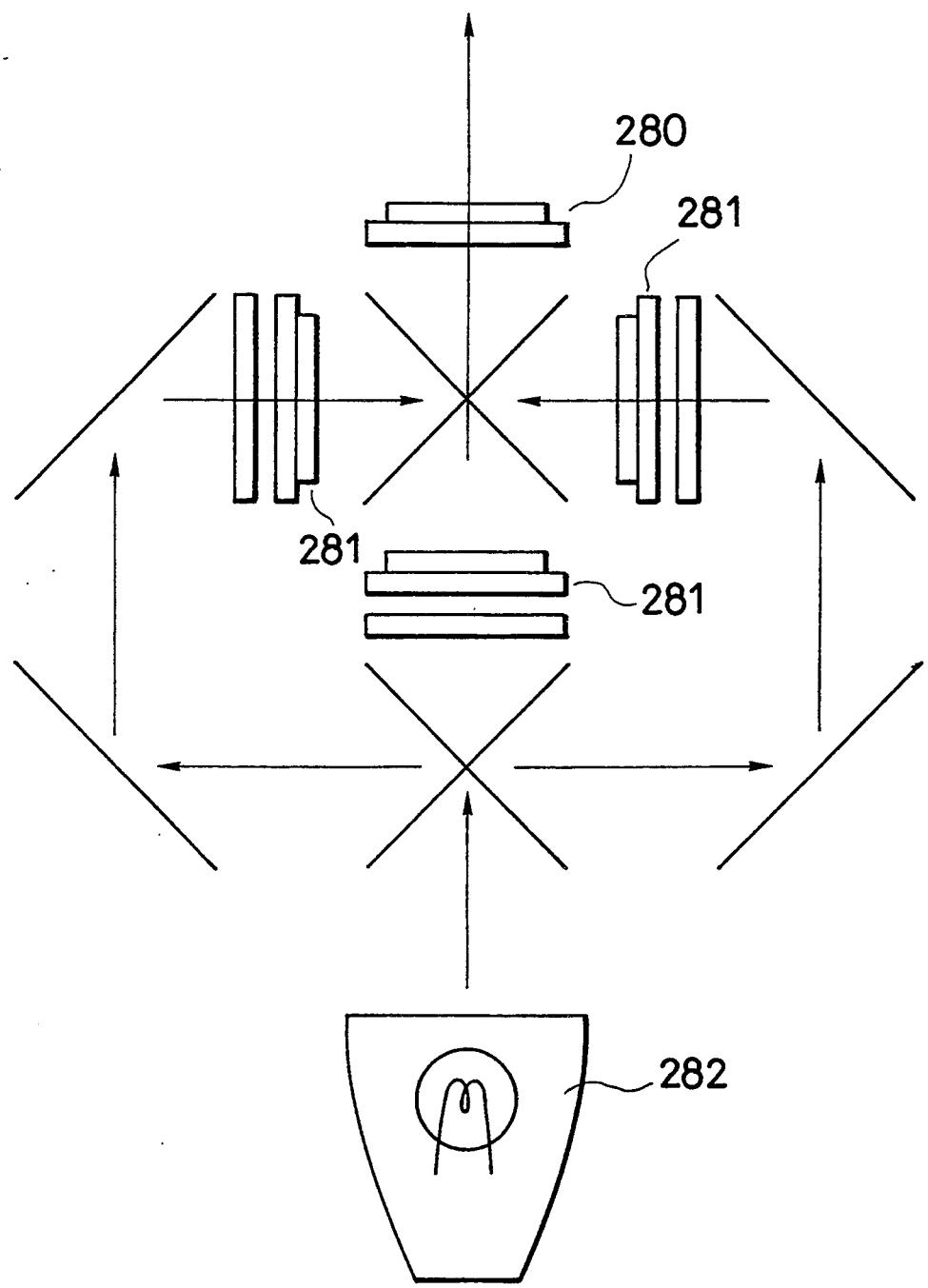

The first device 280, the second devices 281, a light source 282, a screen 283, a mirror 284, an optical system 285, and a tuner 286 are installed as shown in FIGS. 21(A) and 21(B) to obtain a television receiver.

The way of driving this television receiver will be explained below with reference to FIG. 8.

The first device prepared in this embodiment has a pixel arrangement comprising 640 pixels breadthwise and 480 pixels lengthwise, and a signal for writing for 11.58 μsec is applied to 480 leads in the scanning direction. Accordingly, one picture frame has a period of 5.56 msec, and a set of nine picture frames has 33.33 msec.

Figure 8:
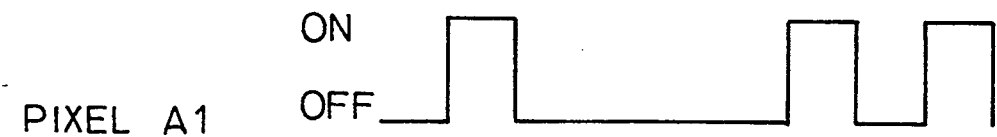
FIG. 8 is a time chart showing a control operation for realizing color tonal display according to the present invention.
Figure 8:
Figure 8:
Figure 8:
Figure 8:
Figure 8:
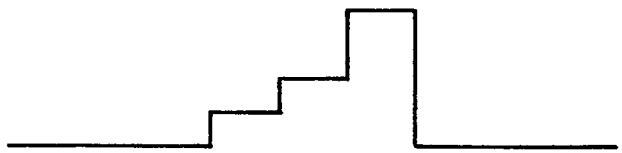
Figure 8:
Figure 9:
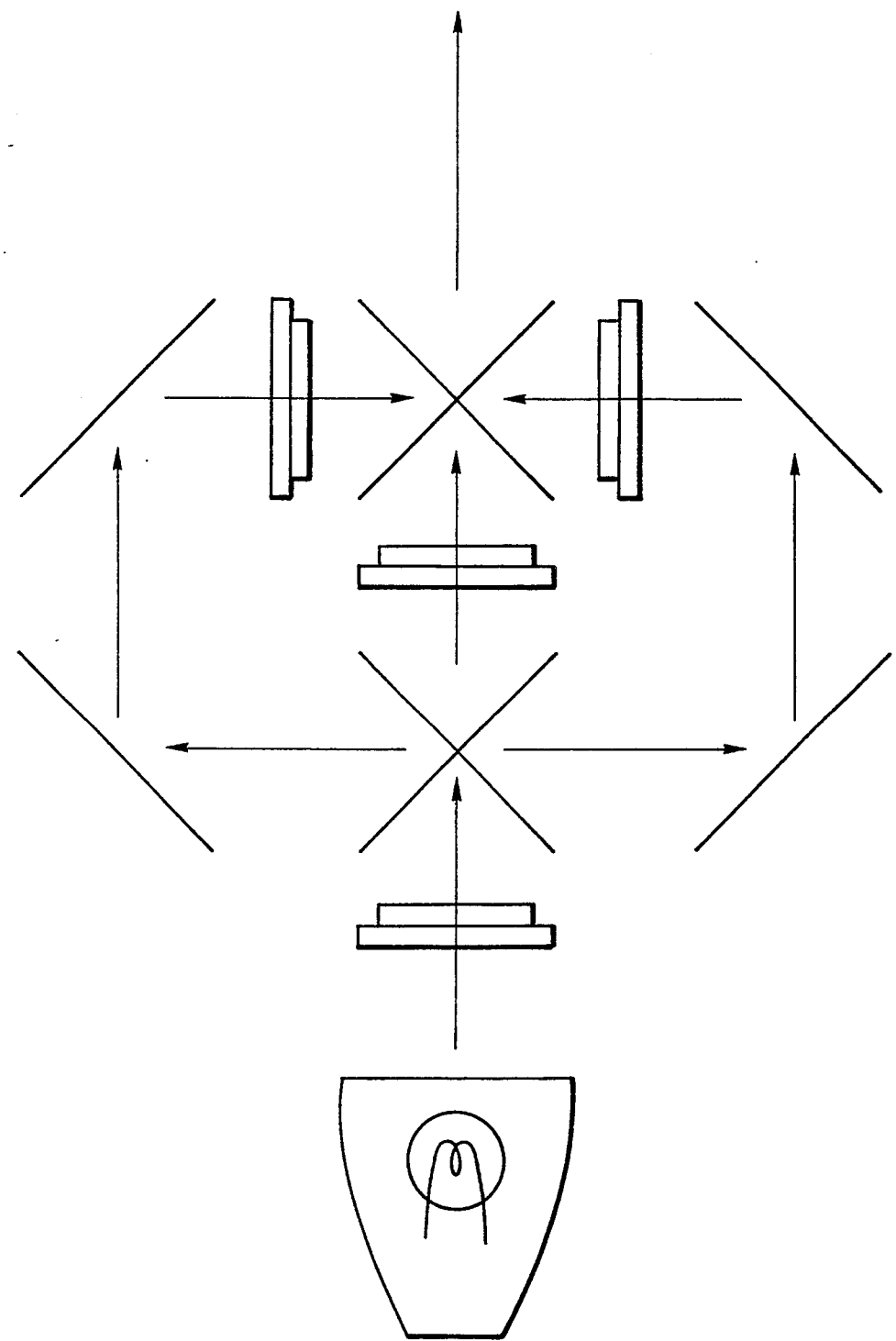
FIGS. 9 and 10 show other arrangements of the present invention.
Figure 10:
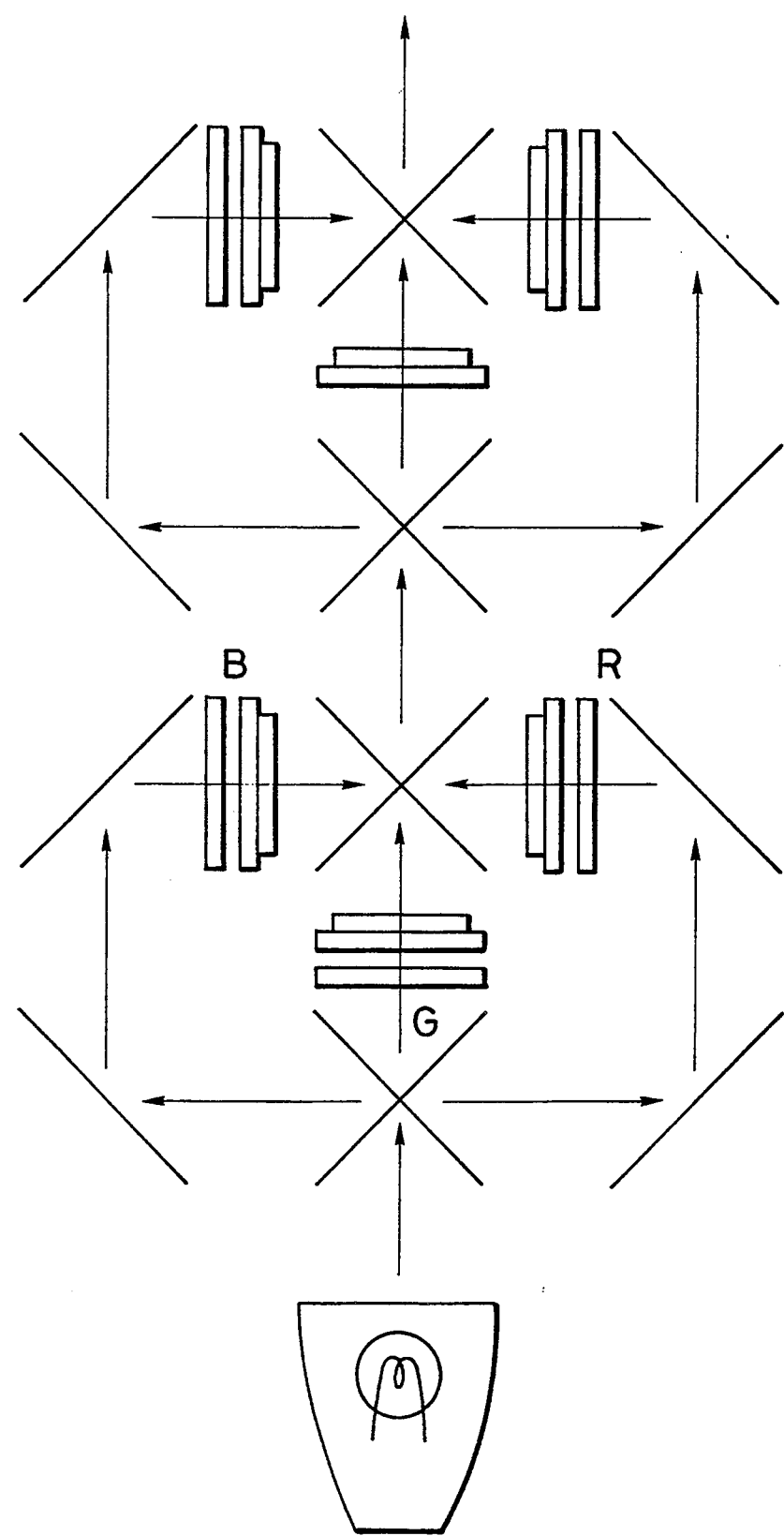
Figure 11:
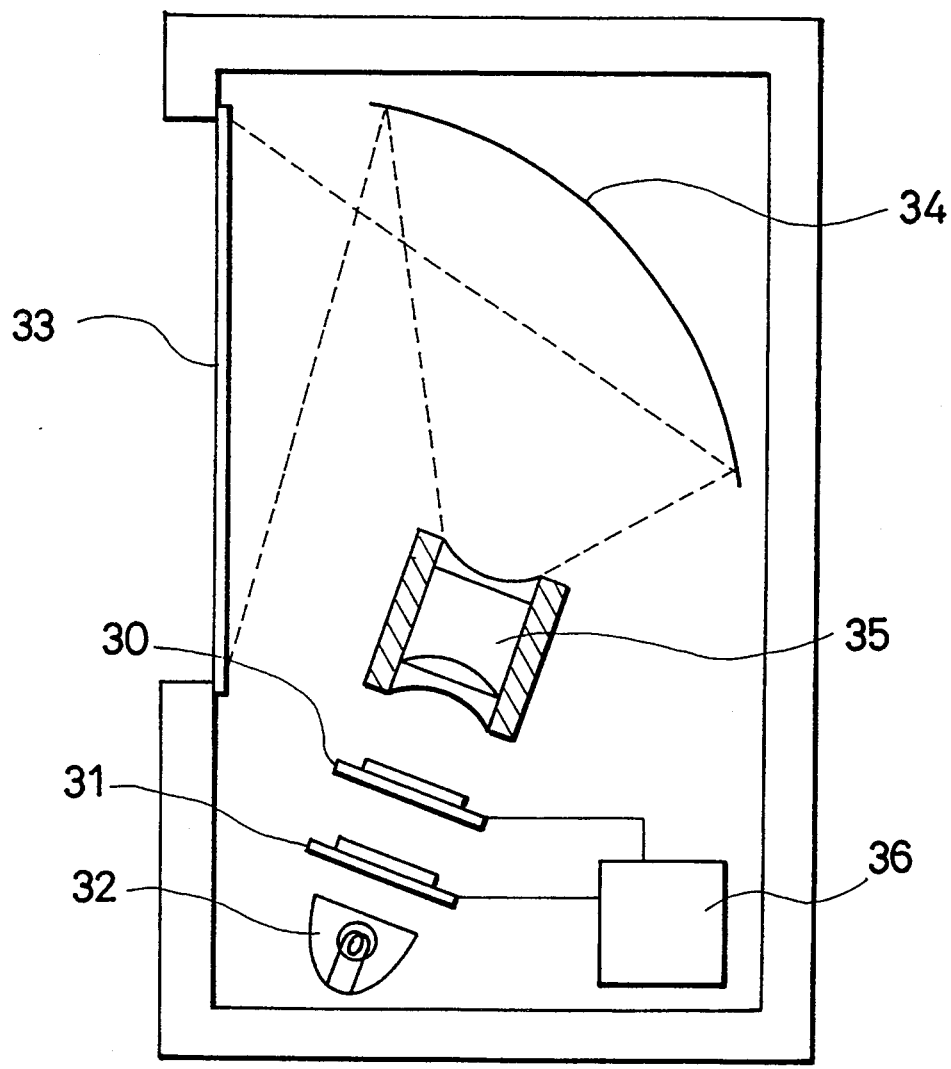
FIG. 11 shows the arrangement of a projection television receiver according to the present invention.

The first of the second devices was driven to transmit light having red color, as shown in FIG. 8 (see transmission factor for R in FIG. 8), such that during the first period $\frac{1}{4}$ of the 100 electrodes, i.e., 25 electrodes, were ON to set the intensity of the transmitted light to $\frac{1}{4}$ of the highest level; during the second period 2/4 of all the electrodes were ON to set the transmitted light intensity to 2/4 of the highest level; during the third period all the electrodes were ON to set the transmitted light intensity to the highest level; and during the fourth to ninth periods all the electrodes were OFF to set the transmitted light intensity to zero.

The second of the second devices was driven to transmit light having green color, as shown in FIG. 8 (see transmission factor for G in FIG. 8), such that during the first to third periods all the 100 electrodes were OFF to set the transmitted light intensity to zero; during the fourth period $\frac{1}{4}$ of all the electrodes, i.e., 25 electrodes, were ON to set the intensity of the transmitted light to $\frac{1}{4}$ of the highest level; during the fifth period 2/4 of all the electrodes were ON to set the transmitted light intensity to 2/4 of the highest level; during the sixth period all the electrodes were ON to set the transmitted light intensity to the highest level; and during the seventh to ninth periods all the electrodes were OFF to set the transmitted light intensity to zero.

The third of the second devices was driven to transmit light having blue color, as shown in FIG. 8 (see transmission factor for B in FIG. 8), such that during the first to sixth periods all the 100 electrodes were OFF to set the transmitted light intensity to zero; during the seventh period ¼ of all the electrodes, i.e., 25 electrodes, were ON to set the intensity of the transmitted light to ¼ of the highest level; during the eighth period 2/4 of all the electrodes were ON to set the transmitted light intensity to 2/4 of the highest level; and during the ninth period all the electrodes were ON to set the transmitted light intensity to the highest level.

In this way, it is possible to realize tonal display with 3 colors and 8 gradation levels, that is, 512 colors.

It is also possible to realize the same tonal display as the above by forming a reflecting optical system with reflection type liquid crystal devices used as second devices, as shown in FIG. 22. In such a case, although in the above-described apparatus transmission type polarizing plates are attached to both outer surfaces, respectively, of each second device, in the modification a reflecting plate is provided at the back of one polarizing plate, thereby forming a reflection type liquid crystal device.

Embodiment 6

Figure 23:
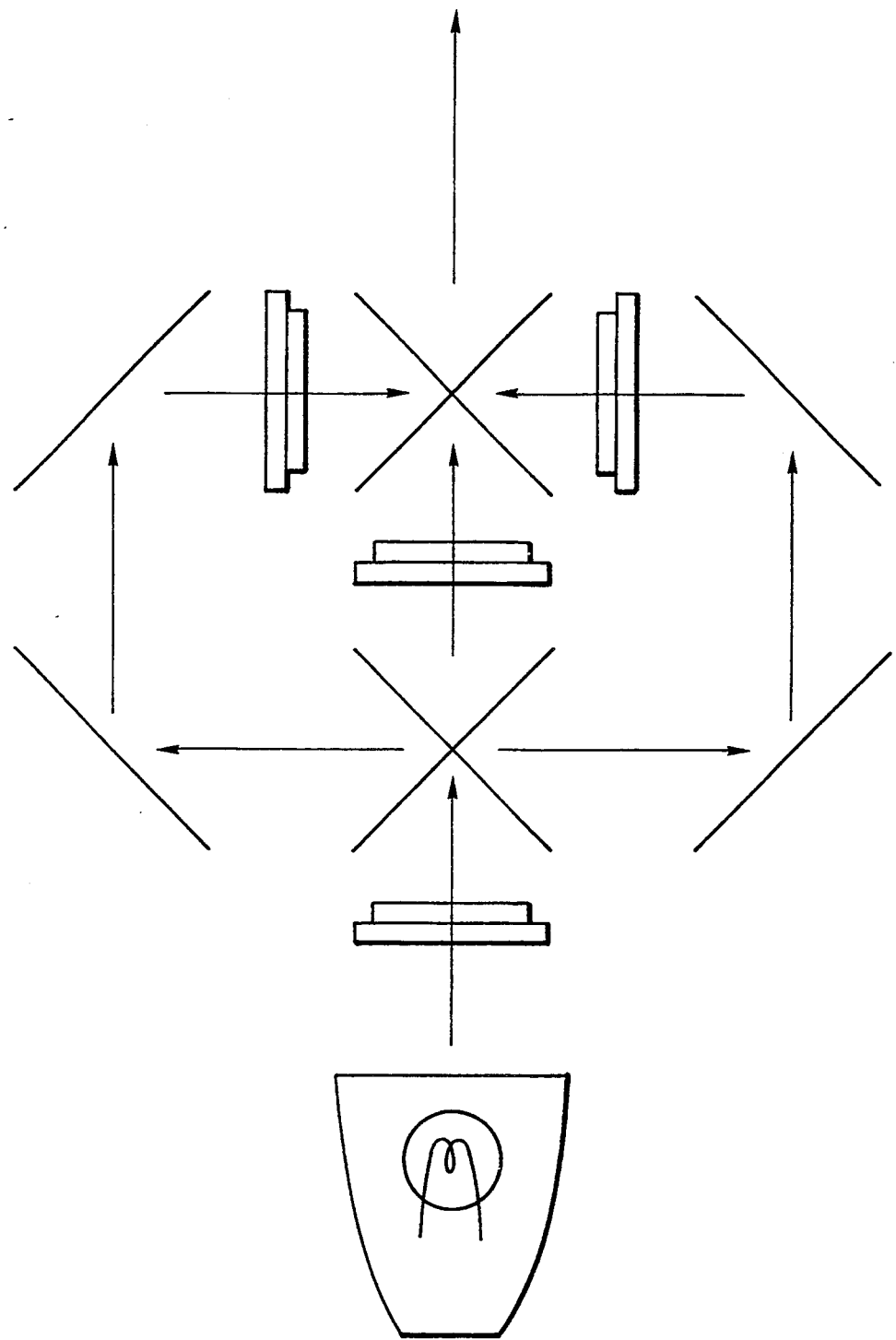
FIGS. 23 and 24 show the arrangement of a sixth embodiment of the present invention.
Figure 24:
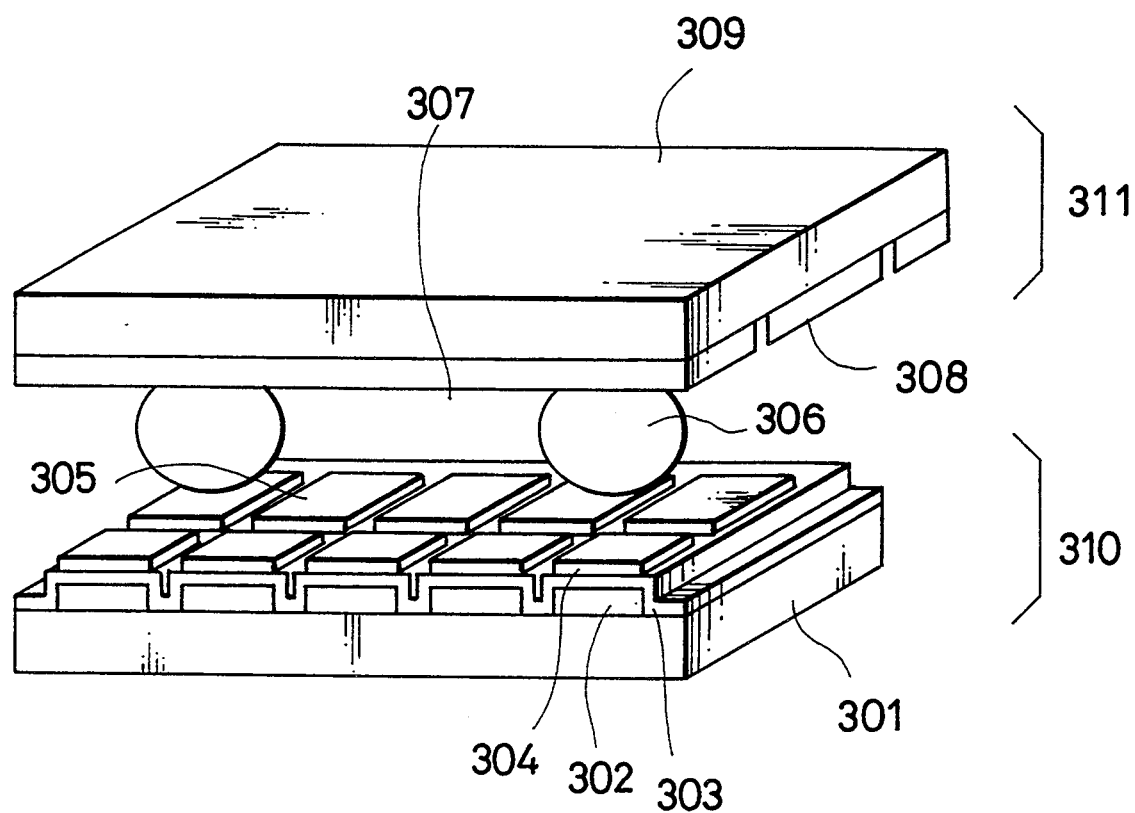

In this embodiment, three first devices described below and one second device similar to that in the embodiment 5 were employed, as shown in FIG. 23. The method of producing a liquid crystal display device employed in this embodiment will first be explained with reference to FIG. 24.

First, ITO was formed to a thickness of 1,000 Å on a soda-lime glass substrate 301 of 1.1 mm by DC sputtering method. Thereafter, the ITO was patterned in the form of stripes with a width substantially the same as the dimension of one side of display pixel electrodes by using photolithographic technique, thereby forming first electrodes 302.

Thereafter, glow discharge was carried out under the following conditions to grow a $Si_XC_YO_Z$ ($X+Y+Z=1$) film 303 to a thickness of 500 Å. The film growth conditions were as follows: The ratios of mixed gases $C_2H_4$, $NF_3$ and $H_2$ were 2 SCCM, 1 SCCM and 10 SCCM; the reaction pressure 50 Pa; and the RF power 100 W.

Figure 25:
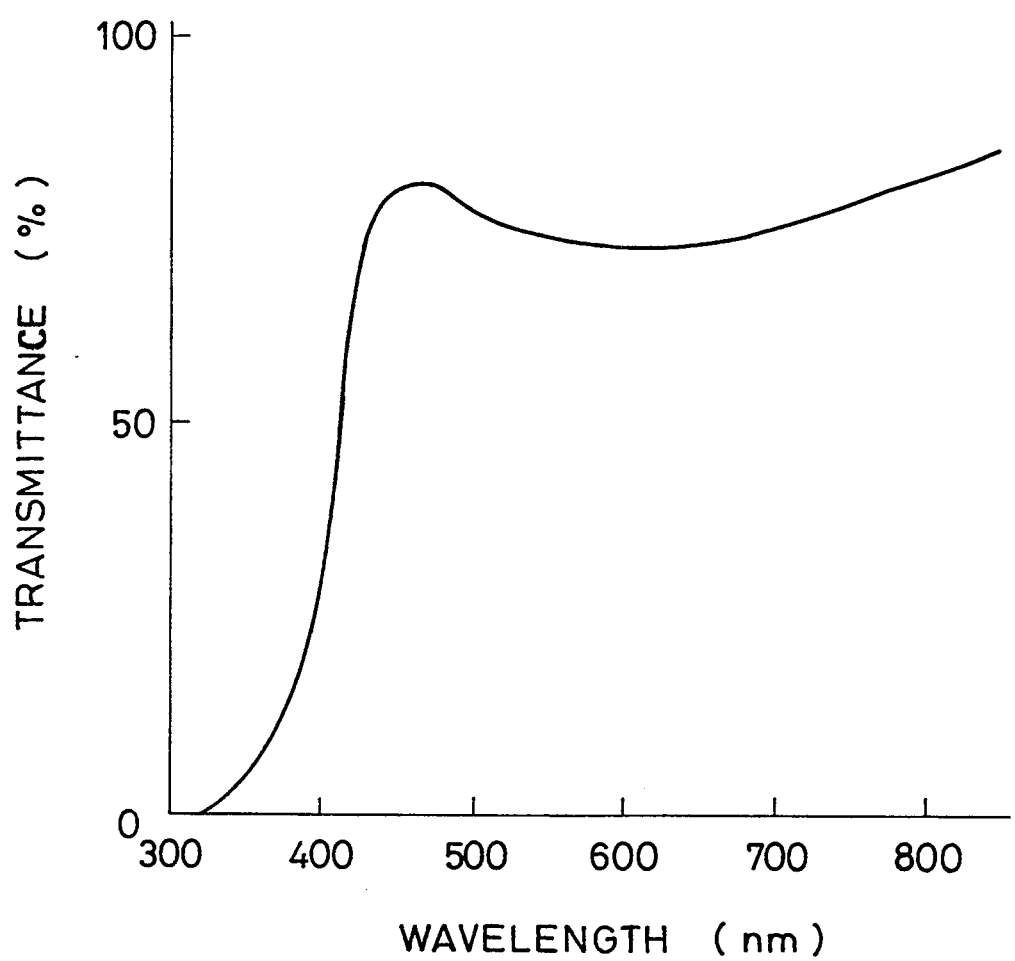
FIG. 25 shows the spectral transmittance of a thin film containing a composition represented by $Si_xC_yO_z$ $(X+Y+Z=1)$ when the thickness is 500 Å.

The reason why $NF_3$ is added in this embodiment is to change the electrical conductivity of the film 303 so as to control the non-linear characteristics. Addition of $NF_3$ in the ratio of not higher than 30% by volume is effective. As a method of controlling the non-linear characteristics, thermal annealing may be employed. With this method, the thin film 303 corresponding to the I (insulator) portion of MIM elements is dehydrogenated to control the hydrogen content in the film, thereby controlling the non-liner characteristics of the MIM elements. The thermal annealing process conditions are as follows: The temperature is 380° C.; the pressure 100 Pa; the processing atmosphere Ar; and the processing time 1 hour. In the present invention, it was possible to improve the transparency of the thin film 303 containing a composition represented by $Si_XC_YO_Z$ ($X+Y+Z=1$) by setting the thickness of the film 303 at not more than 2,000 Å, preferably not more than 500 Å. FIG. 25 shows the spectral transmittance of the thin film containing a composition represented by $Si_XC_YO_Z$ ($X+Y+Z=1$) when the thickness is 500 Å.

Hitherto, when a carbon film, for example, $TaO_5$ (tantalum pentaoxide) film, containing carbon as a component is employed for the insulator portion of an MIM element, the transparency of the film becomes a problem, so that there have heretofore been limitations in the process, for example, the necessity to minimize the area thereof.

Thereafter, ITO was formed to a thickness of 1,000 Å on the film 303 by DC sputtering method and then patterned by using photolithographic technique to obtain second electrodes 304 arranged in a matrix. In this case, magnetron RF sputtering method may also be employed.

Each second electrode, which constitutes one pixel electrode, was formed in the shape of a square one side of which was 250 μm, and gap between adjacent pixels was set to 25 μm. The second electrode 304 has a size sufficient to form a unit pixel when display is effected, and acts such that the electric field applied to the thin film 303 is uniform for each pixel. In this way, a first substrate 310 was obtained.

As to the other substrate, that is, the second substrate 311, ITO was formed to a thickness of 1,000 Å on a soda-lime glass substrate 309 of 1.1 mm by DC sputtering method. Thereafter, the ITO was patterned in the form of stripes with a width substantially the same as the dimension of one side of display pixel electrodes by using photolithographic technique, thereby forming third electrodes 308.

A polyimide thin film was formed to a thickness of 200 Å on the first substrate 310 by printing method, and then an orientation film 305 was provided by rubbing method as a means for arranging liquid crystal molecules in a predetermined direction.

Between the first and second substrates 310 and 311, a ferroelectric liquid crystal material 307 and resin spacers 306 for maintaining the required gap between the two substrates were placed, and the periphery of the resulting sandwich structure was fixed with an epoxy adhesive.

Thereafter, an LSI for driving the liquid crystal material was connected to leads connecting with the first and third electrodes 302 and 308 by using COG method to obtain a liquid crystal display device. An electric field can be applied to the liquid crystal material between the first and third electrodes.

Figure 26A:
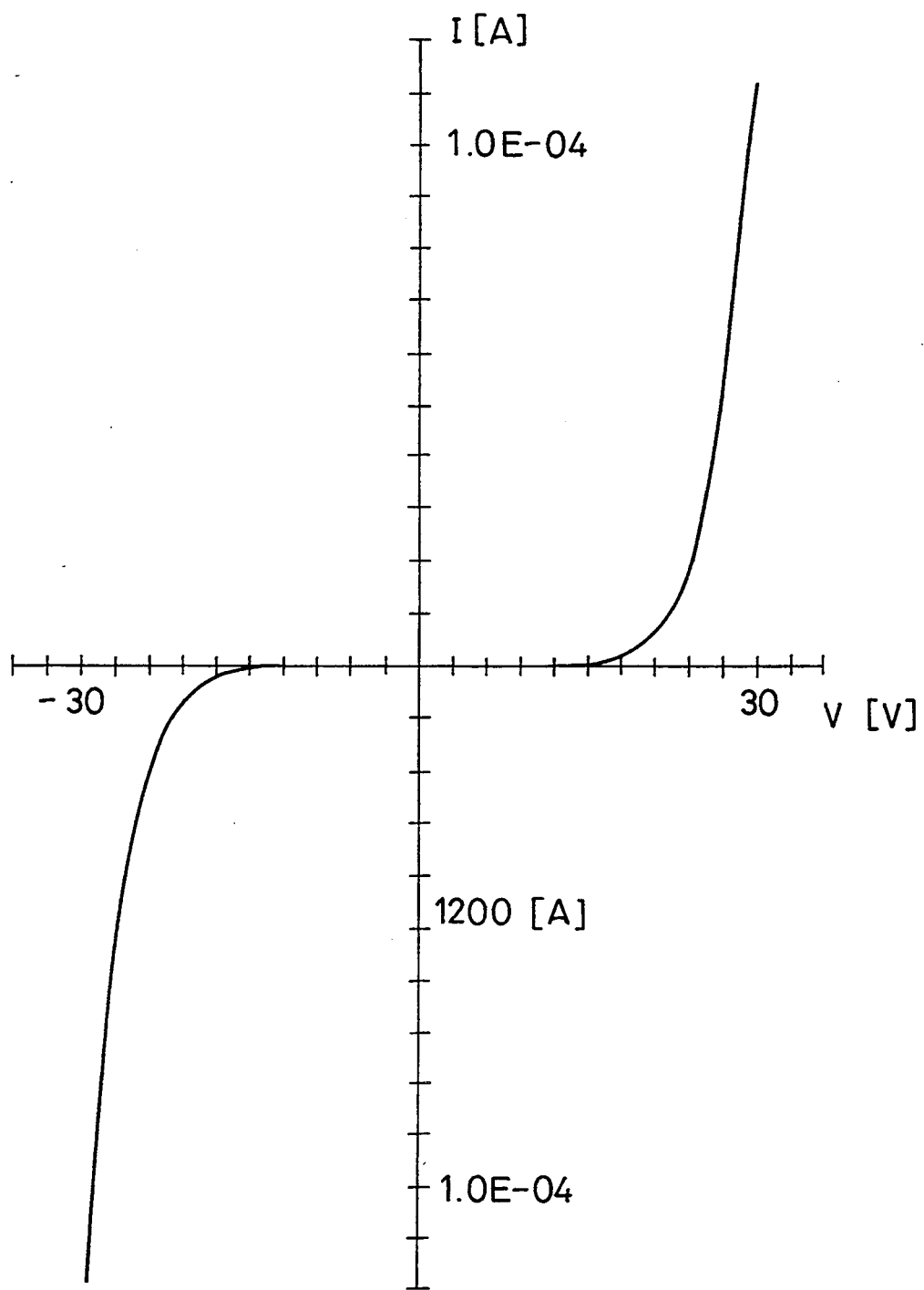
FIGS. 26(A) and 26(B) show the current-voltage characteristics of non-linear elements in the sixth embodiment.
Figure 26B:
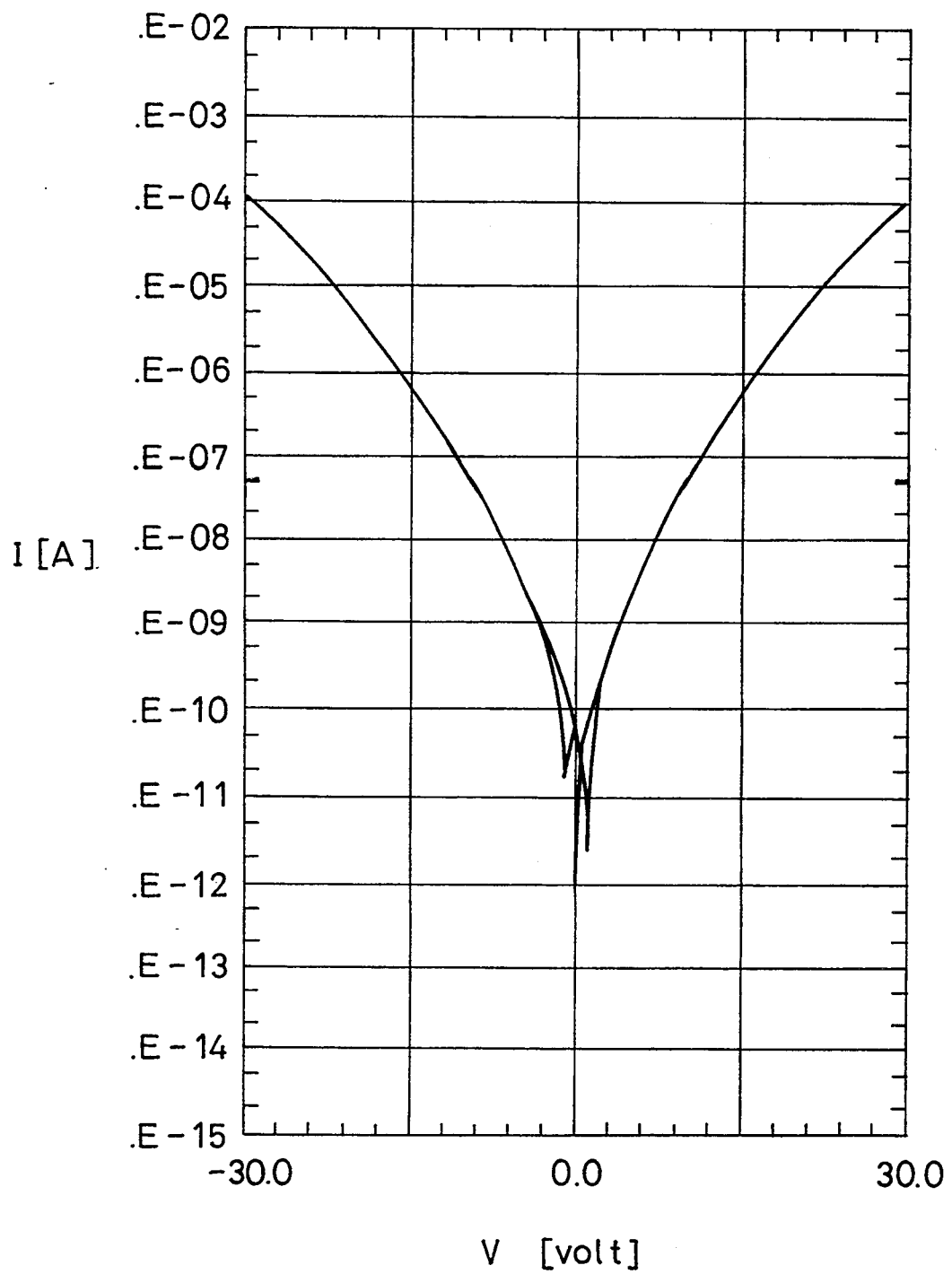

The thin film 303 formed in this embodiment had transparency and caused no optical problem as long as the thickness was 500 Å. FIGS. 26 (A) and 26 (B) show the current-voltage characteristics of the non-linear elements (non-linear electric devices) in this embodiment.

The way of driving this electro-optical apparatus will be explained below.

The three first devices prepared in this embodiment each have a pixel arrangement comprising 640 pixels breadthwise and 480 pixels lengthwise, and a signal for writing for 17.36 μsec is applied to 480 leads in the scanning direction. Accordingly, one picture frame has a period of 8.33 msec, and a set of four picture frames has 33.33 msec.

The second device was arranged such that during the first period ⅛ of all the 100 electrodes were ON to set the intensity of the transmitted light to ⅛ of the highest level; during the second period 2/8 of all the electrodes were ON to set the intensity of the transmitted light to ¼ of the highest level; during the third period 4/8 of all the electrodes were ON to set the transmitted light intensity to ½ of the highest level; and during the fourth period all the electrodes were ON to set the transmitted light intensity to the highest level.

Thus, it is possible to realize tonal display with 3 colors and 16 gradation levels, that is, 4,096 colors.

Figure 27:
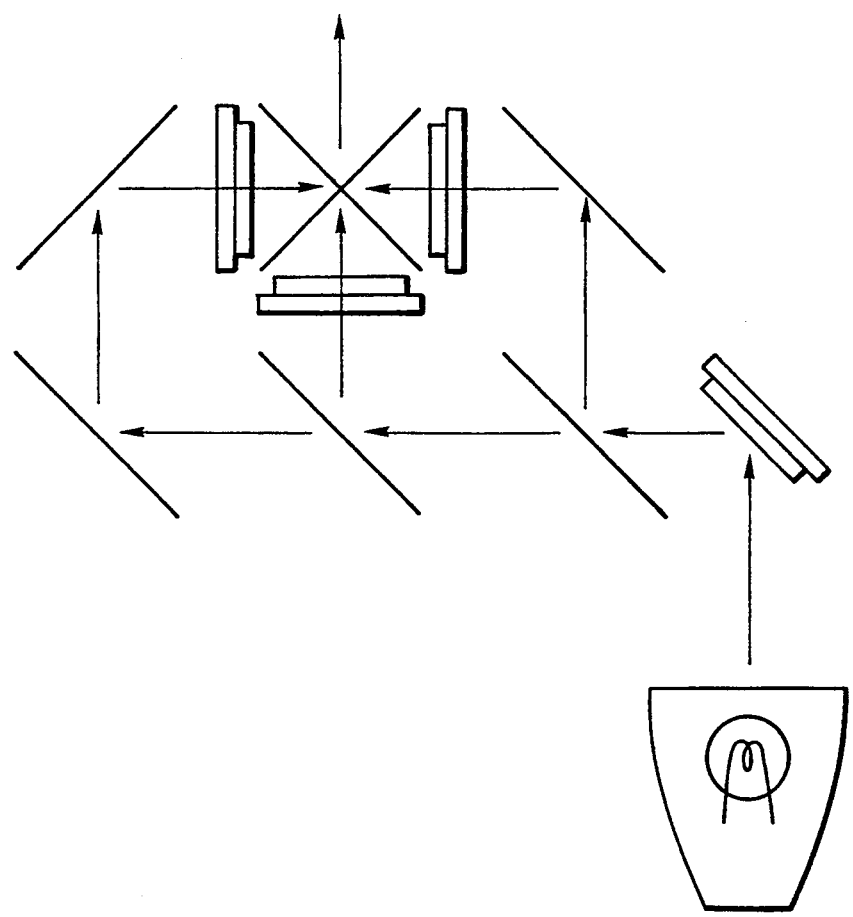
FIG. 27 shows the arrangement of a modification of the sixth embodiment.

It is also possible to realize the same tonal display as the above by forming a reflecting optical system with a reflection type liquid crystal device used as a second device, as shown in FIG. 27. In such a case, although in the above-described apparatus transmission type polarizing plates are attached to both outer surfaces, respectively, of the second device, in the modification a reflecting plate is provided at the back of one polarizing plate, thereby forming a reflection type liquid crystal device.

Embodiment 7

Figure 28:
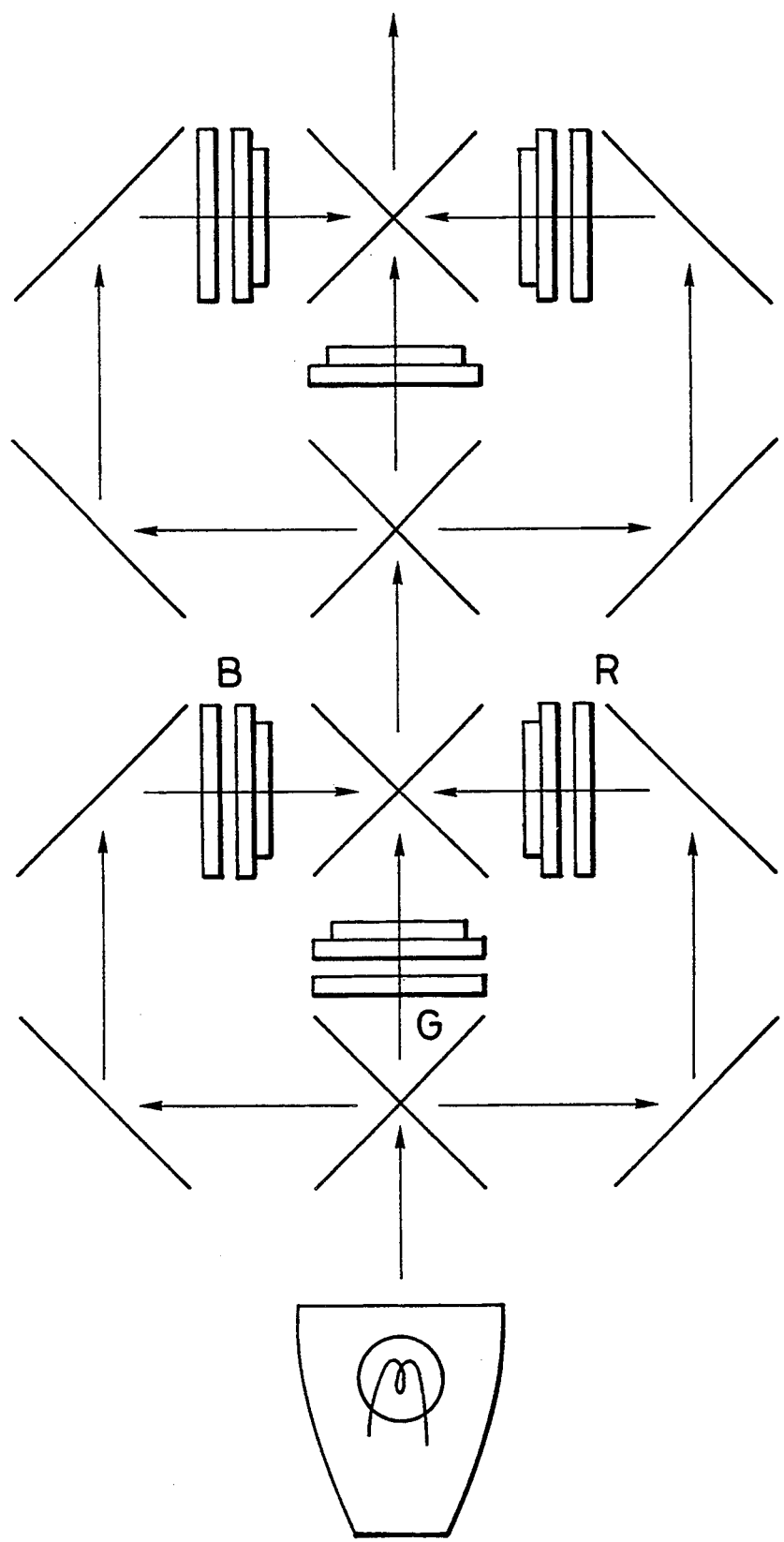
FIG. 28 shows the arrangement of a seventh embodiment of the present invention.

In this embodiment, three first devices similar to those in the embodiment 5 were employed, together with three second devices each having one electrode and lead, as shown in FIG. 28.

The way of driving this electro-optical apparatus will be explained below.

The first devices prepared in this embodiment each have a pixel arrangement comprising 640 pixels breadthwise and 480 pixels lengthwise, and a signal for writing for 23.15 μsec is applied to 480 leads in the scanning direction. Accordingly, one picture frame has a period of 11.11 msec, and a set of three picture frames has 33.33 msec.

The second devices were arranged such that during the first period the device for red was ON, during the second period the device for green was ON, and during the third period the device for blue was ON, thereby changing colors of light supplied to the first devices in time-series manner according to the three primary colors.

Thus, it is possible to realize tonal display with 3 colors and 8 gradation levels, that is, 512 colors.

Embodiment 8

Figure 7:
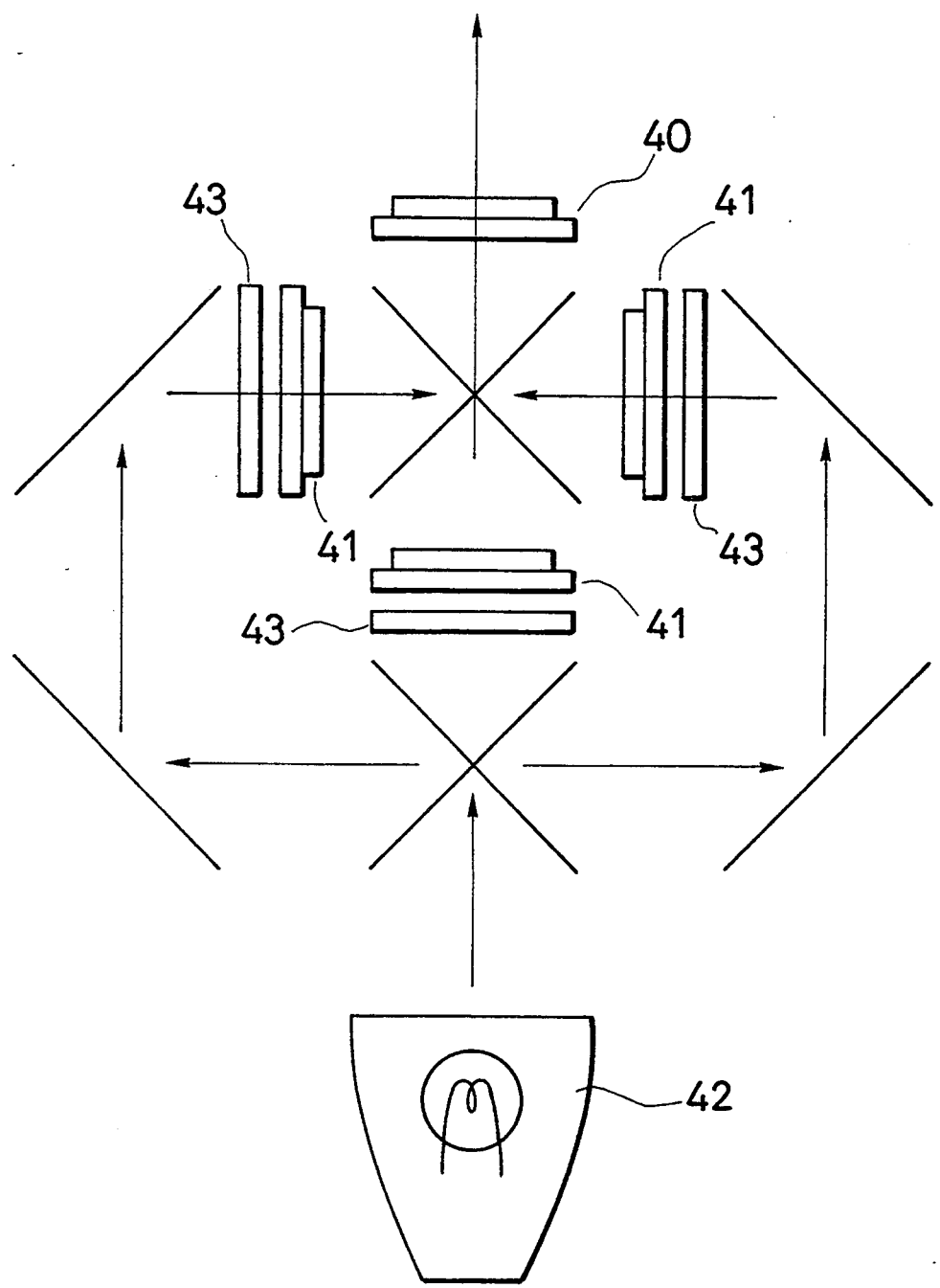
FIG. 7 shows the arrangement of a color television receiver according to the present invention.

In this embodiment, a ferroelectric liquid crystal (FLC) display device with an inverter type circuit configuration such as that shown in FIG. 18 is employed. FIG. 19 shows an actual arrangement of electrodes and other constituent elements corresponding to the circuit configuration shown in FIG. 18. In these figures, only a portion corresponding to a matrix of 2×2 is shown for simplification of illustration. Actual driving signal waveforms are shown in FIG. 14. In this case also, description is made with signal waveforms for a matrix arrangement of 4×4 for simplification of illustration. The specific arrangement of liquid crystal devices is shown in FIG. 7. That is, a first device 40 and three second devices 41 are provided, and the second devices have respective color filters 43 corresponding to R, G and B, which are provided between the same and a light source 42.

As shown in FIGS. 15(A) to 15(F), PTFT 13, NTFT 22, electrodes, etc. are formed on a substrate 50 in the same manner as in the embodiment 1 to form a structure such as that shown in FIG. 15(F).

The first substrate for a liquid crystal device prepared according to the above-described method and the second substrate having a transparent electrode provided over the whole surface of a glass substrate were bonded to each other with a ferroelectric liquid crystal composition disposed in the gap therebetween to form a liquid crystal cell. Referring to FIG. 18, the PTFT 13 is provided at the intersection of a first scanning line 5 and a data line 3. A PTFT for another pixel is similarly provided at the intersection of the first scanning line 5 and a data line 4. The NTFT 22 is provided at the intersection of a second scanning line 8 and the data line 3. A PTFT for another pixel is provided at the intersection of another first scanning line 6, which is adjacent to the scanning line 8, and the data line 3. The liquid crystal device has such a matrix arrangement (the inverter type in this case) employing C/TFTs. The PTFT 13 is connected to the first scanning line 5 and the data line 3 as follows: The input terminal of the drain 10 is connected to the first scanning line 5 through the contact 69; the gate 9 is connected to the data line 3 that is formed in a multilayer interconnection structure; and the output terminal of the source 12 is connected to the pixel electrode 17 through the contact 67.

In the meantime, the NTFT 22 is connected to the second scanning line 8 and the data line 3 as follows: The input terminal of the drain 20 is connected to the second scanning line 8 through the contact; the gate 19 is connected to the data line 3; and the output terminal of the drain 18 is connected to the pixel electrode 17 through the contact 68 in the same way as in the PTFT 13. Thus, one pixel is formed in the area defined between a pair of scanning lines 5 and 8, the pixel comprising the electrode 17 of transparent conductor film and the C/TFT arrangement of the PTFT 13 and the NTFT 22. Such a structure is repeated both lengthwise and breadthwise to thereby enable the matrix of 2×2 to be enlarged to a liquid crystal display device with a large number of pixels, e.g. 640×480 or 1280×960.

The feature of this embodiment resides in that the pixel electrode 17 can be fixed to one or another of three values for the liquid crystal potential $V_{LC}$ by virtue of the complementary arrangement of two TFTs provided for each pixel.

Driving signals applicable to this embodiment are shown in FIG. 14. FIG. 14 shows exemplarily driving signals for a matrix of 4×4. In FIG. 14, $X_{1a}X_{1b}$, $X_{2a}X_{2b}$, $X_{3a}X_{3b}$ and $X_{4a}X_{4b}$ function as pairs of scanning signal lines in the direction X, respectively, while $Y_1$, $Y_2$, $Y_3$ and $Y_4$ function as data lines in the direction Y.

In this embodiment, if one picture frame is formed by applying driving signals for a plurality of frames to the liquid crystal material, tonal display can readily be effected by making the number of times of application of a select signal to specific pixels smaller than the number of frames constituting one picture frame.

In the present invention, an organic film is employed as an orientation film, and in order to increase the switching speed, the operating voltage is set in the range of from ±20 to ±25 V and the cell gap is reduced to 1 to 3 μm.

The semiconductor material used for TFTs in this embodiment is not necessarily exclusive, and other semiconductor material may also be used.

Figure 29:
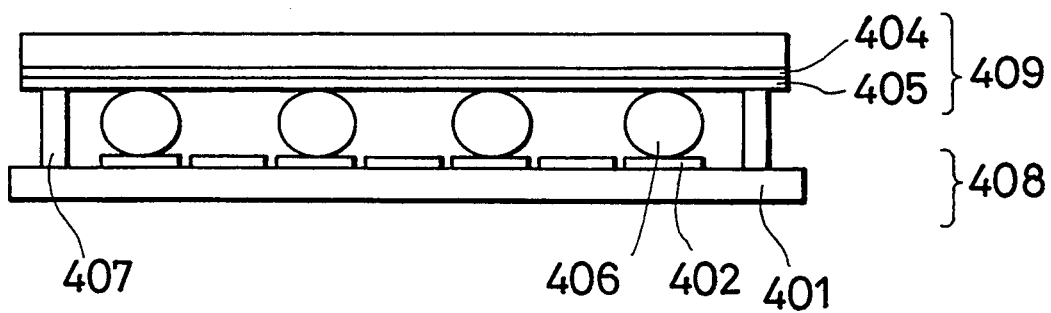
FIG. 29 shows a sectional structure of one second liquid crystal device in an eighth embodiment of the present invention.

Referring to FIG. 29, which shows a sectional structure of one second liquid crystal device in this embodiment, an ITO (indium tin oxide) thin film 402 was formed to a thickness of 1,200 Å on a soda-lime glass substrate 401 having a thickness of 1.1 mm by DC sputtering method. Thereafter, electrodes and leads were formed by using photolithographic technique to obtain a first substrate 408. In the meantime, electrodes and leads 404 were provided on a similar substrate, and polyimide was printed thereon to a thickness of 800 Å by offsetting method. After burning for 30 minutes at 380° C., the surface was rubbed in a predetermined direction with thick-piled cloth to provide a means 405 for orienting the liquid crystal composition at least in an initial stage, thereby obtaining a second substrate 409.

An epoxy adhesive 407 was printed on the periphery of the first substrate 408 by using screen printing method, and silica particles 406 having a diameter of 4.2 μm were spread on the second substrate 409 by spin method at a rate of 200 particles per mm$^2$. Thereafter, the first and second substrates 408 and 409 were bonded to each other to obtain a second device.

The driving method will next be explained with reference to FIGS. 30 and 6.

Assuming that colors which are to be displayed by the pixels A1 106 to B2 109 are set as follows: the pixel A1 (R0, G0 and B1), the pixel A2 (R1, G1 and B1), the pixel B1 (R0, G1 and B1), and the pixel B2 (Rl, G0 and Bl), during the first period 211 of three periods the pixel A1 106 of the first device is OFF (opaque), while the pixel A2 is ON (transparent), and during the second and third periods also, ON/OFF control is similarly effected to thereby form one picture frame.

In this way, color display can be performed with 8 colors. If the first device is arranged to provide 8 gradation levels, 512 colors can be displayed.

According to the present invention, it is possible to realize tonal display, which has heretofore been difficult to attain, in addition to the advantages of the conventional liquid crystal display device employing a ferroelectric liquid crystal material, that is, the wide angle of field, the high contrast, and the high response speed. Thus, the amount of information which can be displayed increases. In addition, it is possible to reduce the weight of the television receiver by about 70% in comparison to the conventional TV receiver using a cathode-ray tube. It is also possible to improve the yield.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to the particular use contemplated. An example of such modifications is an apparatus shown in FIG. 31.

Figure 31:
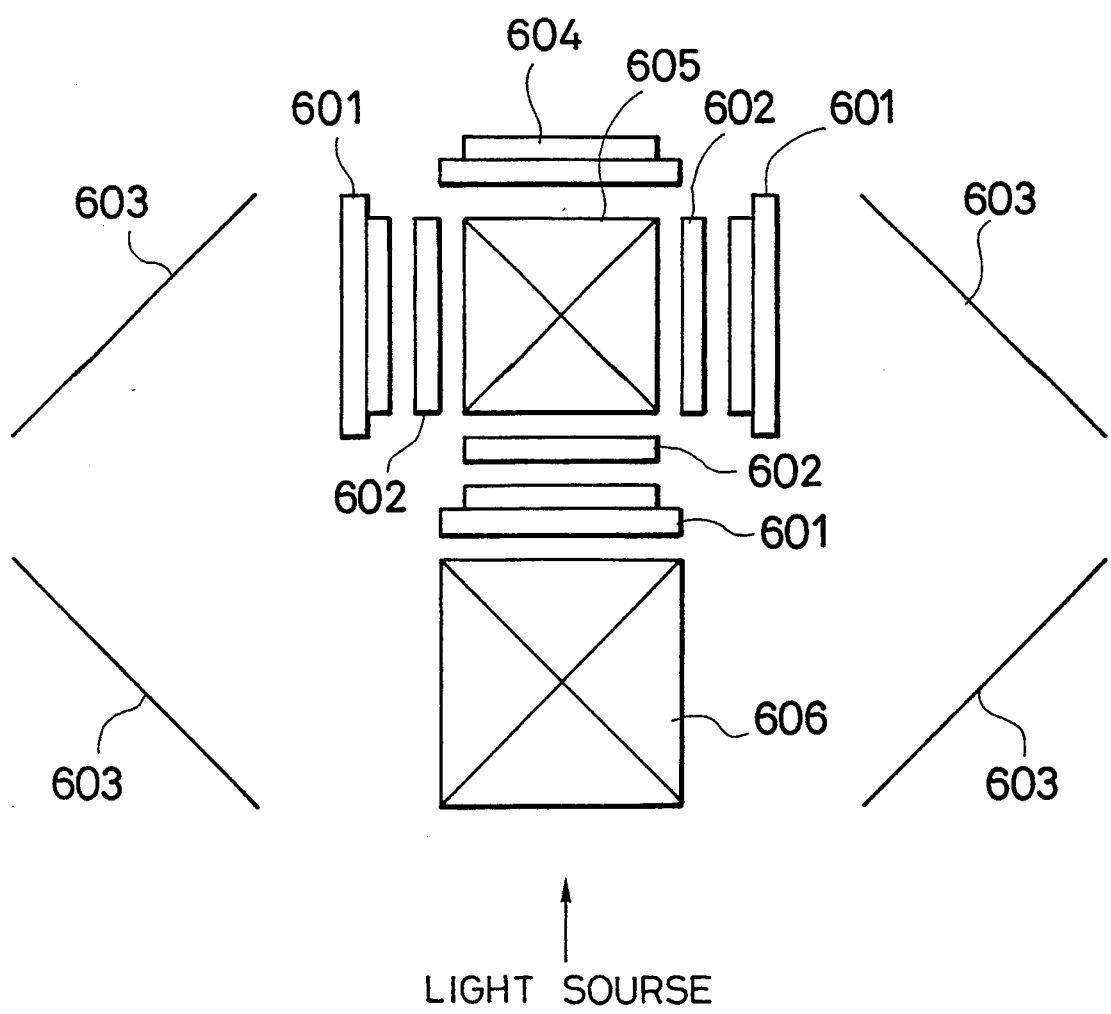
FIG. 31 shows the arrangement of a picture image projecting portion of a television receiver according to the present invention.

A composition of a picture image projecting portion in a television receiver is shown in FIG. 31. The television receiver comprises a first device of a conventional light transmission type liquid crystal display device 604 and, as a means enabling gradation display, a second device composed of a liquid crystal device 601 provided with a pair of pixel electrodes and a ND filter 602. ND filter is an abbreviation for 'Neutral Density filter', which is an optical filter capable of setting arbitrarily the light transmission factor. Needless to say, any other filters may be employed as long as the light transmission factor thereof can be set arbitrarily.

Further, the present invention is characterized in that the light transmission factors (transmittance) of the ND filters are set in the ratios of approximately $2^0$ to $2^1$ to $2^2$ to ... to $2^n$ (n is an arbitrary number). For simplification, the following description will be made by using light intensity data consisting of 3 bits.

An apparatus for effecting tonal display by using light intensity data consisting of 3 bits is explained below.

As one example of the present invention, a television receiver shown in FIG. 31 comprises a first device 604 and three second devices for effecting tonal display, each of the devices including a pair of first and second substrates each having electrodes and leads formed thereon, which sandwich therebetween a liquid crystal composition and a means for orienting the liquid crystal composition at least in an initial stage. With this structure, it is aimed that one picture frame to be actually displayed is projected with a set of three picture frames.

Light emitted from a light source passes through an optical system 606, which comprises half mirrors being intersected to divide the light in three different directions, and is directed to the three second devices 601 at an even intensity, respectively.

Numerals 603 in FIG. 31 denote mirrors, which are arranged so as to lead the light emitted from the light source toward the second devices located on the right and left sides.

Numerals 602 denote ND filters, the light transmission factor of which can be changed in the ratios of approximately $2^0$ to $2^1$ to $2^2$ to ... to $2^n$ (n is an arbitrary number). Since the apparatus shown in FIG. 31 is provided with three ND filters and thus is able to employ three kinds of light intensity levels, tonal display is effected by using the light intensity data consisting of 3 bits. Hence, tonal display with 8 gradation levels can be effected by the combination of the ON/OFF of the second devices 601 and the three kinds of light intensity levels of the ND filters 602 since $2^3=8$.

That is, tonal display can be controlled by the second devices.

When providing in a television receiver five second devices each having an ND filter in the same way as in FIG. 31 with the light transmission factors of the ND filters set in the ratios of approximately $2^0$ to $2^1$ to $2^2$ to ... to $2^5$ one picture frame i.e. one picture image of one moment which persons actually recognize, can be displayed by displaying five picture frames sequentially in the same way as described above, whereby tonal display with 32 gradation levels can be effected by using the light intensity data consisting of 5 bits since $2^5=32$. The light transmission factors are set as the above because binary code is utilized to effect tonal display with the ON/OFF pattern, i.e. the binary number.

In the case where the first device 604 of the television receiver shown in FIG. 31 is a liquid crystal electro-optical device having pixels arranged in a matrix of 2×2 as shown in FIG. 18, one example of the way of effecting tonal display with such a television receiver is as follows.

Figure 1:
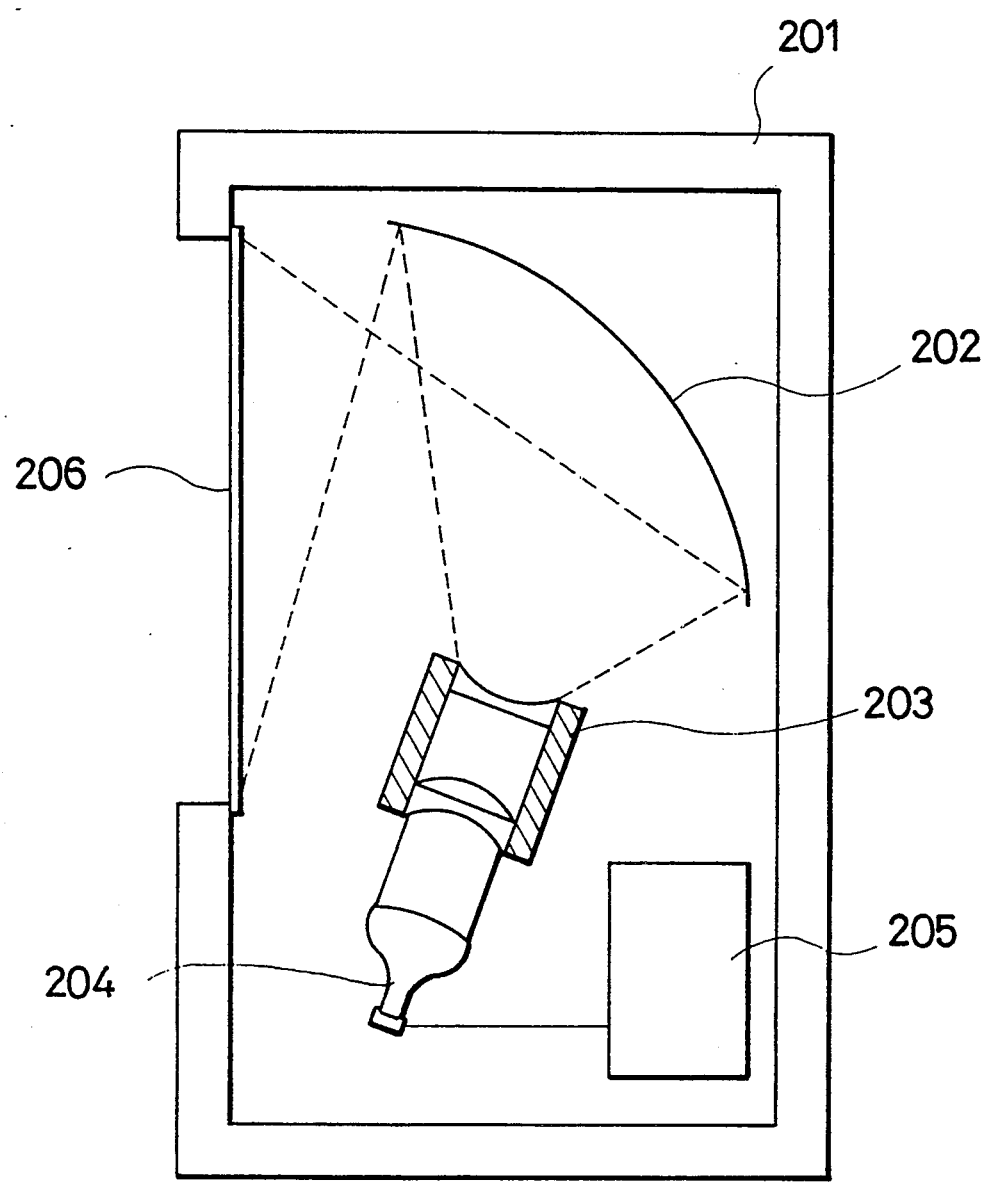
FIG. 1 shows schematically the arrangement of a conventional projection television receiver.
Figure 2:
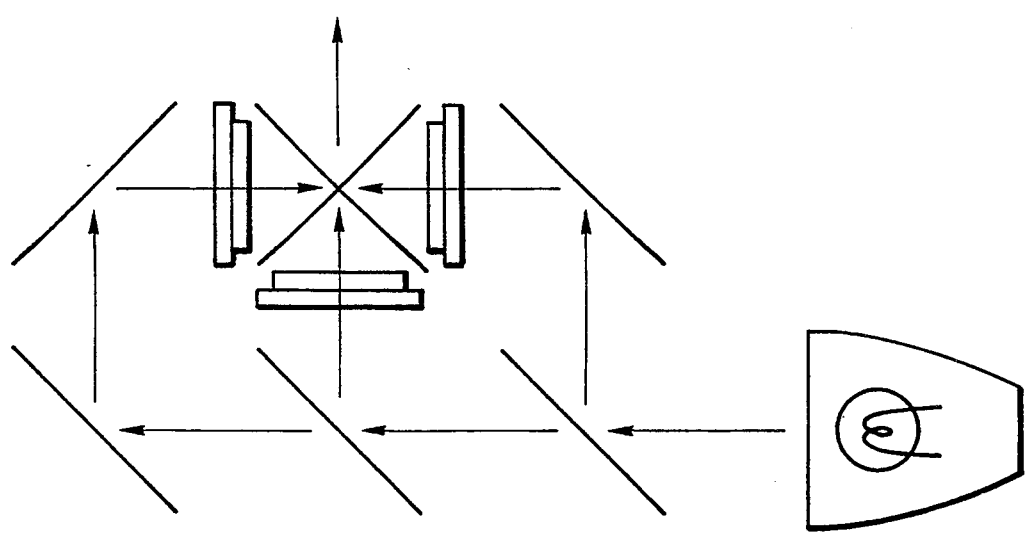
FIG. 2 shows the structure of a prior art using as a display member a liquid crystal panel employing thin-film transistors formed of amorphous silicon.
Figure 3:
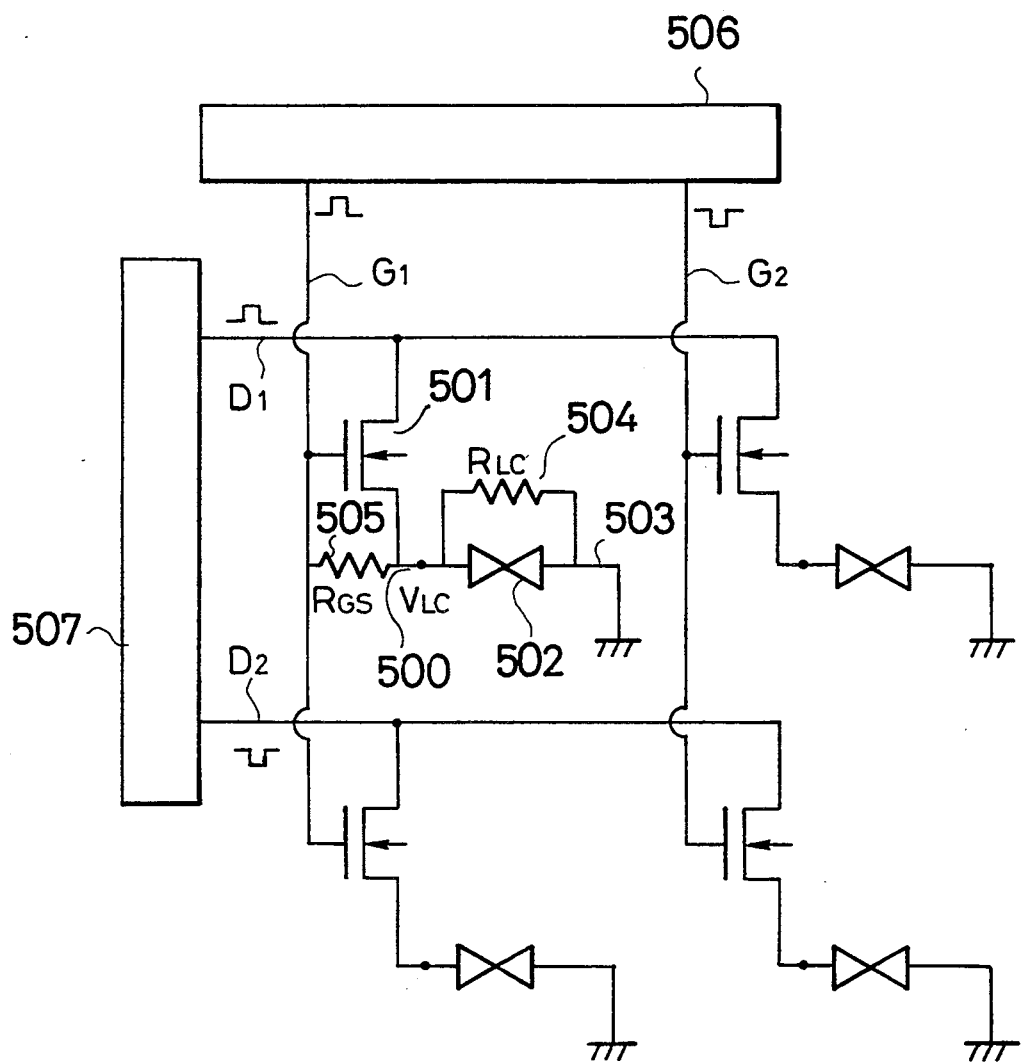
FIG. 3 shows a typical conventional active matrix arrangement.
Figure 4:
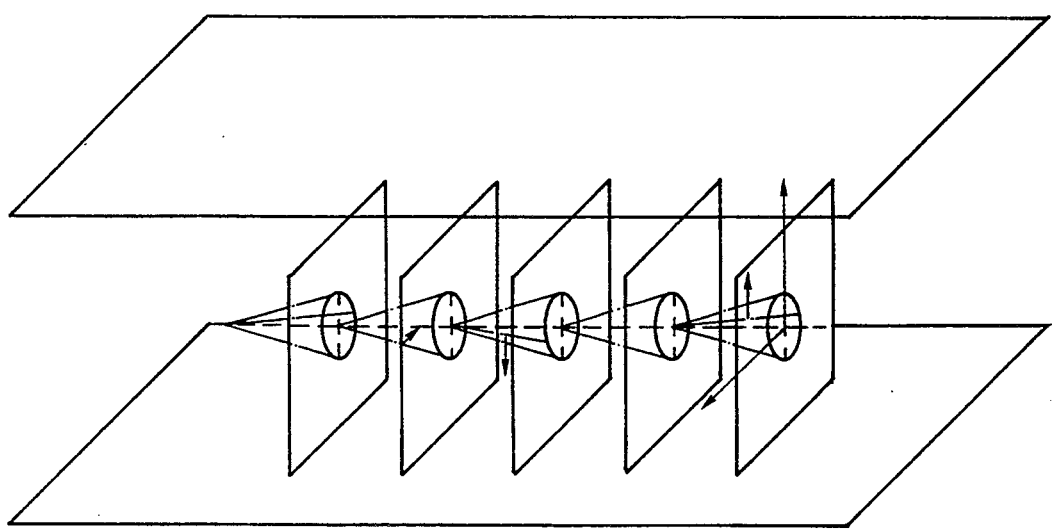
FIG. 4 is a conceptual view of a display device employing a ferroelectric liquid crystal material.
Figure 5A:
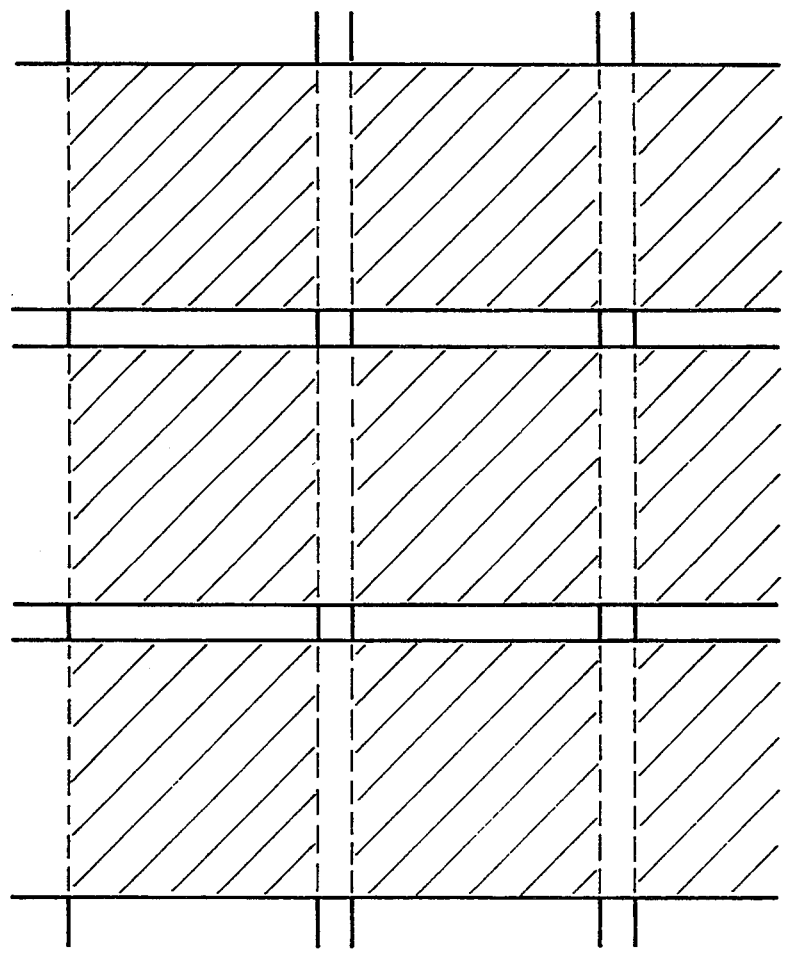
FIG. 5(a) shows an electrode structure designed for tonal display with 2 gradation levels.
Figure 6:
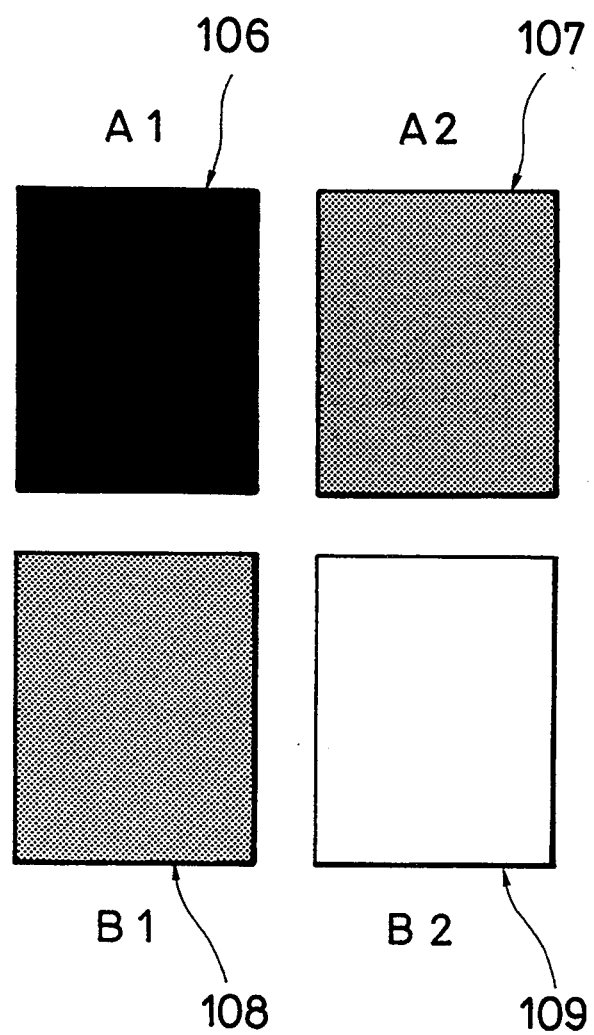
FIG. 6 shows a matrix arrangement formed on a first device in the electro-optical apparatus according to the present invention.

FIG. 6 shows an image pattern displayed on pixels arranged in a matrix of 2×2.

In FIG. 6, it is assumed that 8 gradation levels are denoted by G0, G1, 2 ..., G7 toward the light side from the dark side and the image pattern display of FIG. 6 is effected with the pixel A1 106 at the level G0, the pixel A2 107 at the level G3, the pixel B1 108 at the level G5 and the pixel B2 109 at the level G7.

The way of effecting the image pattern display shown in FIG. 6 will be described hereinafter.

In this case, since three second devices are provided as in FIG. 31, one picture frame to be actually recognized is projected by displaying sequentially three picture frames having different light intensity respectively.

Table 1 above shows the relation between the ON-/OFF pattern of each pixel of the first liquid crystal electro-optical device and the ratio of the transmitted light intensity, i.e. the ratio of the light transmission factor, of the second liquid crystal electro-optical devices provided with ND filters during the display shown in FIG. 6.

For the first picture frame, the light intensity is set to 1 by changing the light transmission factor of the second device provided with the ND filter, and the pixels on the first device are brought into the respective states: the pixel A1 is OFF (opaque); the pixel A2 is ON (transparent); the pixel B1 is ON (transparent); and the pixel B2 is ON (transparent).

For the second picture frame, the light intensity is set to 2 by changing the light transmission factor of the second device provided with the ND filter, and the pixels on the first device are brought into the respective states: the pixel A1 is OFF (opaque); the pixel A2 is ON (transparent); the pixel B1 is OFF (opaque); and the pixel B2 is ON (transparent).

For the third picture frame, the light intensity is set to 4 by changing the light transmission factor of the second device provided with the ND filter, and the pixels on the first device are brought into the respective states: the pixel A1 is OFF (opaque); the pixel A2 is OFF (opaque); the pixel B1 is ON (transparent); and the pixel B2 is ON (transparent).

In this manner, tonal display shown in FIG. 6 is effected.

Thus, tonal display with 8 gradation levels can be effected with a set of three picture frames by controlling the first and second devices in the manner described above. Although in the foregoing the 3-bit (n=3) representation is used, it should be noted that it is not necessarily exclusive and that n-bit (n=an arbitrary natural number) representation may be employed. Also, a color display apparatus capable of effecting tonal display can be obtained by employing as the first device 604 color display devices comprising three color filters of R (red), G (green), and B (blue).

In the present invention, a simple light transmission type liquid crystal device having a single pixel, more specifically, a kind of an optical shutter may be used as the second device. Also, any display devices other than liquid crystal electro-optical devices may be used as the first device as long as it is a display device that transmits light and is able to effect display by projecting the light transmitted by the device on a screen.

For simplification of the composition, reflection type second liquid crystal electro-optical devices provided with ND filters may be provided in place of the reflection mirrors 603 in FIG. 31. In this case, by selecting the second devices having different reflectance respectively, effect equivalent to that obtained by the composition of the present invention can be expected.

Further, as other example, a device same as the first device used in Embodiment 2 may be used as the first device 604 in FIG. 31.

In the above example, when a liquid crystal display apparatus is fabricated using as the second devices liquid crystal devices where a nematic liquid crystal is dispersed in a photo-curable modified acrylic resin, preferable tonal display can be effected.

What is claimed is:

1. An electro-optical device comprising:
    a first electro-optical panel comprising a pair of substrates, an electro-optical modulating layer provided therebetween, and means for applying an electric field to individually control pixel elements defined in said layer;
    a second electro-optical panel for supplying said first panel with light at a variable intensity level, said second panel comprising a pair of substrates, an electro-optical modulating layer provided therebetween, and means for applying an electric field to said layer of said second panel; and
    control means for varying the intensity of light transmitted by said second electro-optical panel in a repeating cycle;
    wherein said second panel can transmit light incident on one of said substrates of said second panel and said first panel is provided on the side of said second panel opposite to the side of said one of said substrates.

2. The device of claim 1 wherein said first panel comprises pixels arranged in a matrix and the light transmitted by said second panel can be incident on said pixels.

3. The device of claim 1 wherein said electro-optical modulating layer of said first panel comprises a ferroelectric liquid crystal.

4. The device of claim 1 wherein said layer of said second panel comprises a ferroelectric liquid crystal.

5. The device of claim 1 wherein said layer of said second panel comprises a polymer resin and a liquid crystal selected from the group consisting of a nematic liquid crystal, a cholesteric liquid crystal, and a smectic liquid crystal.

6. The device of claim 1 wherein said electric field applying means of said first panel comprises a plurality of electrodes provided on one of said substrates of said first panel in the form of a matrix, each electrode operatively connected with a complementary p-channel transistor and n-channel transistor pair.

7. The device of claim 1 wherein said first and second panels are provided between a light source and a screen.

8. The device of claim 1 further comprising means for synchronously controlling the pixel elements of the first electro-optical panel in conjunction with said light intensity varying cycle to transmit a selected total intensity of light through each said pixel element for the cycle.

9. The device of claim 8 further comprising color varying means for selectively changing the color of light supplied to said first panel by said second panel in a repeating cycle to produce time-sequential color transmissions.

10. The device of claim 9 wherein the color varying means includes a means for providing red, green, and blue colors in sequence and wherein the control means includes speed determining means for controlling the time-sequential color transmissions and selective intensity transmissions within said color transmissions through the first panel at a speed such that an apparent color picture image is formed thereby when the transmission through the first panel is viewed with human persistence of vision.

11. An electro-optical device comprising:
    a first electro-optical panel comprising a pair of substrates, an electro-optical modulating layer provided therebetween and means for applying an electric field to said layer;

a second electro-optical panel comprising a pair of substrates, an electro-optical modulating layer provided therebetween, and a plurality of electrode strips for applying an electric field to said layer of said second panel; and brightness level cycling means for cyclically applying an electric potential to a series of different predetermined numbers of said strips to cyclically vary a light transmission of said second panel;

wherein said first panel and said second panel are provided between a light source and a viewing position for viewing said device.

12. The device of claim 11 wherein said first panel comprises pixels arranged in a matrix and light transmitted by said second panel can be incident on said pixels.

13. The device of claim 11 wherein said light transmission can be varied with time rotationally at a ratio $2^0:2^1:2^2: \ldots :2^n$ where n is a natural number.

14. The device of claim 11 wherein said layers of said first panel and said second panel comprise ferroelectric liquid crystals, respectively.

15. An electro-optical device comprising:

a first electro-optical panel comprising a pair of substrates, an electro-optical modulating layer provided therebetween, and means for applying an electric field to said layer;

a second electro-optical panel adjacent to said first panel, comprising a pair of substrates, an electro-optical modulating layer provided therebetween, and an electrode means for selectively applying an electric field to different regions of said layer; and brightness control means connected to said second panel for controlling said electrode means to vary the intensity of light passing through said second panel in a repeating cycle, using both spatial and temporal variation of the field applied to said second panel.

16. The device of claim 15 wherein the brightness control means includes means for selectively activating different fractions of a total number of electrodes of the second panel, so that different spatial fractions of a surface area of said second panel are sequentially activated in a temporally repeated cycle.

17. A television receiver for projecting a visual image on a screen comprising:

a first electro-optical panel comprising a pair of substrates, an electro-optical modulating layer provided therebetween and means for applying an electric field to individually control picture elements defined in said layer;

a second electro-optical panel comprising a pair of substrates, an electro-optical modulating layer provided therebetween, and means for applying an electric field to said layer of said second panel to selectively vary intensity of light transmitted through said second panel;

control means for varying the intensity of light transmitted by said second electro-optical panel in a repeating cycle; and means for synchronously controlling the pixel elements of the first electro-optical panel in conjunction with said light intensity varying cycle to transmit a selected total intensity of light through each said pixel element for the cycle;

wherein said first panel and said second panel are provided between a light source and said screen on a path of light emitted from said light source.

18. The receiver of claim 17 further comprising color varying means for selectively changing the color of light supplied to said first panel by said second panel in a repeating cycle to produce time-sequential color transmissions.

19. The receiver of claim 18 wherein the color varying means includes a means for providing red, green, and blue colors in sequence and wherein the control means includes speed determining means for controlling the time-sequential color transmissions and selective intensity transmissions within said color transmissions through the first panel at a speed such that an apparent color picture image is formed thereby when the transmission through the first panel is viewed with human persistence of vision.

20. An electro-optical device comprising:

first and second electro-optical panels, each comprising a pair of substrates, an electro-optical modulating layer provided therebetween, and means for applying an electric field to said layer;

control means for varying the intensity of light transmitted by said second electro-optical panel in a repeating cycle; and means for synchronously controlling the pixel elements of the first electro-optical panel in conjunction with said light intensity varying cycle to transmit a selected total intensity of light through each said pixel element for the cycle.

21. The device of claim 20 further comprising color varying means for selectively changing the color of light supplied to said first panel by said second panel in a repeating cycle to produce time-sequential color transmissions.

22. The device of claim 21 wherein the color varying means includes a means for providing red, green, and blue colors in sequence and wherein the control means includes speed determining means for controlling the time-sequential color transmissions and selective intensity transmissions within said color transmissions through the first panel at a speed such that an apparent color picture image is formed thereby when the transmission through the first panel is viewed with human persistence of vision.

* * * * *